(12) United States Patent
Oztekin et al.

(10) Patent No.: US 8,468,143 B1
(45) Date of Patent: Jun. 18, 2013

(54) SYSTEM AND METHOD FOR DIRECTING QUESTIONS TO CONSULTANTS THROUGH PROFILE MATCHING

(75) Inventors: Bilgenhan Uygar Oztekin, Mountain View, CA (US); Steven D. Baker, San Francisco, CA (US); Bryan C. Horling, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 353 days.

(21) Appl. No.: 12/756,075

(22) Filed: Apr. 7, 2010

(51) Int. Cl.
*G06F 17/30* (2006.01)

(52) U.S. Cl.
USPC ............................ 707/706; 707/754; 707/728

(58) Field of Classification Search
USPC ..................... 707/768, 754, 740, 726; 706/12
See application file for complete search history.

(56) References Cited

U.S. PATENT DOCUMENTS

| | | | |
|---|---|---|---|
| 8,060,463 B1 * | 11/2011 | Spiegel .......................... | 707/609 |
| 2007/0162432 A1 * | 7/2007 | Armstrong et al. ............... | 707/3 |
| 2008/0120278 A1 | 5/2008 | Roe et al. | |
| 2009/0077055 A1 | 3/2009 | Dillon et al. | |
| 2009/0100047 A1 * | 4/2009 | Jones et al. ......................... | 707/3 |
| 2009/0216563 A1 * | 8/2009 | Sandoval et al. ............. | 707/102 |
| 2009/0287658 A1 | 11/2009 | Bennett | |
| 2010/0042583 A1 | 2/2010 | Gervais et al. | |
| 2011/0010367 A1 * | 1/2011 | Jockish et al. ................. | 707/733 |
| 2011/0082848 A1 * | 4/2011 | Goldentouch ................. | 707/706 |
| 2011/0082860 A1 | 4/2011 | Xing et al. | |
| 2011/0219295 A1 * | 9/2011 | Adams et al. ................. | 707/723 |
| 2011/0264651 A1 | 10/2011 | Selvaraj et al. | |

OTHER PUBLICATIONS

International Search Report and Written Opinion, PCT/US2010/030279, Jul. 15, 2010. 6 pgs.
Castillo, *Query-Log Mining for Detecting Polysemy and Spam*, WebKDD 2008: Workshop on Web Mining and Web Usage Analysis, Aug. 27, 2008, 14 pgs. http:// chato.cl/papers/ccdfg_2008_polysem_spam.pdf.

* cited by examiner

*Primary Examiner* — Wilson Lee
*Assistant Examiner* — Thuy Bui
(74) *Attorney, Agent, or Firm* — Morgan, Lewis & Bockius LLP

(57) ABSTRACT

A server system receives a question from an inquirer at a client. In response, the server system identifies a plurality of information items corresponding to the question. At least one of the information items has associated classification data profiling the information therein. The server system generates a profile for the question based on the classification data of the information items and identifies one or more consultants for the question among a plurality of candidates in accordance with a comparison of the question profile and the candidates' respective user profiles. The server system submits the question to at least one of the consultants for answer. After receiving an answer to the question from the consultant, the server system forwards the answer to a client for display to the inquirer.

20 Claims, 20 Drawing Sheets

```
                            ┌─ 900
     ┌─────────────────────────────────────────────────────┐
     │  My Questions:    [      902        ]    [ Submit ] │
     │                  ┌─904-1    ┌─904-3   ┌─904-5       │
     │                                                 ┌─904-7
     │  904  solar panel for home use (1 comment) 5 hours ago  (v) │
     │                                                     │
     │  906  LCD vs Plasma (2 comments) 12 hours ago   (v) │
     └─────────────────────────────────────────────────────┘
```

FIG. 9A

```
                            ┌─ 900
     ┌─────────────────────────────────────────────────────┐
     │  My Questions:    [      902        ]    [ Submit ] │
     │                                                     │
     │     solar panel for home use (1 comment) 5 hours ago  (v) │
     │                                                     │
     │     LCD vs Plasma (2 comments) 12 hours ago     (∧) │
     │                          ┌─906-1  ┌─906-3  ┌─906-5  │
     │       ┌─────────────────────────────────────┐       │
     │       │    Jackie - Feb. 28 (Public)  [✉]   │ 906-7 │
     │       │  LCD seems to have an edge over plasma. Vizio and │
     │       │  Pioneer both announced recently that they will stop │
     │       │  manufacturing plasma TVs. Click the link below.  ┌─906-8
     │       │    http://www.techshout.com/general/2009/13/vizio-and- │
     │       │  pioneer-to-opt-out-of-plasma-tv-market/ │
     │       └─────────────────────────────────────┘       │
     │                                         ┌─906-9     │
     │       ┌─────────────────────────────────────┐       │
     │       │    Henry - Mar. 2 (Private)   [✉]   │       │
     │       │  It depends on many factors. I don't necessarily agree │
     │       │  with Jackie simply because of that news alone. For a │
     │       │  more comprehensive comparison, I suggest you visit: │
     │       │    http://reviews.cnet.com/4351-12658_7-6583301.html │
     │       └─────────────────────────────────────┘       │
     └─────────────────────────────────────────────────────┘
```

FIG. 9B

SYSTEM AND METHOD FOR DIRECTING QUESTIONS TO CONSULTANTS THROUGH PROFILE MATCHING

RELATED APPLICATIONS

This application relates to U.S. patent application Ser. No. 12/420,775, "Generating Improved Document Classification Data Using Historical Search Results," filed on Apr. 8, 2009, which is hereby incorporated by reference in its entirety.

TECHNICAL FIELD

The disclosed embodiments relate generally to online services offered on a client-server environment and, in particular, systems and methods for directing questions to consultants through profile matching.

BACKGROUND

The Internet is a convenient platform for people to exchange information. For example, a person seeking an answer to a question can post the question on the Internet by, e.g., sending an email message to his or her friends. Another person who receives the email message can answer the question by replying to the email message. There are multiple issues with this question-answer model. First, if the questioner does not know which friend(s) may be able to answer the question, he or she may have to send the question to a large number of friends or acquaintances, making it difficult to protect his or her privacy. This approach could also lead to email spamming on the receiving end of the question. Second, even if the questioner receives multiple answers to his or her question, he or she may find it quite challenging to tell which answer is the most credible without reading all of the answers.

SUMMARY

In some embodiments, a server system receives a question from an inquirer at a client. In response, the server system identifies a plurality of information items corresponding to the question. At least one of the information items has associated classification data profiling the information therein. The server system generates a profile for the question based on the classification data of the information items and identifies one or more consultants for the question among a plurality of candidates in accordance with a comparison of the question profile and respective user profiles of the candidates. The server system submits the question to at least one of the consultants for answer.

In some embodiments, the server system receives a request from a consultant at a respective client. The request is a request for questions or queries posted by others. The consultant has a user profile. The server system accesses a pool of questions, stored in memory (which may include non-volatile as well as volatile memory devices), submitted by one or more inquirers. Each question in the pool has a question profile. Optionally, the question profile is determined in accordance with information items associated with the question. The server system selects one or more questions for the consultant from the pool of questions in accordance with a comparison of their respective question profiles and the consultant's user profile and sends the selected questions to the respective client for display to the consultant.

In some embodiments, the server system comprises one or more processors, memory, and one or more programs stored in the memory and configured to be executed by the processors. The programs include instructions for receiving a question from an inquirer at a client; instructions for identifying a plurality of information items corresponding to the question, one or more of the information items each having classification data; instructions for generating a profile for the question based on the classification data of the information items; instructions for identifying one or more consultants for the question among a plurality of candidates in accordance with a comparison of the question profile and respective user profiles of the candidates; and instructions for submitting the question to at least one of the consultants for answer.

In some embodiments, the server system comprises one or more processors, memory, and one or more programs stored in the memory and configured to be executed by the processors. The programs include instructions for receiving a request from a consultant at a respective client, the consultant having a user profile; instructions for accessing a pool of questions, stored in memory, submitted by one or more inquirers, each question having a question profile determined in accordance with information items associated with the question; instructions for selecting one or more questions for the consultant from the pool of questions in accordance with a comparison of their respective question profiles and the consultant's user profile; and instructions for sending the selected questions to the respective client for display to the consultant.

In some embodiments, a computer readable storage medium having stored therein instructions, which when executed by one or more processors of a server system, cause the server system to: receive a question from an inquirer at a client; identify a plurality of information items corresponding to the question, one or more of the information items each having classification data; generate a profile for the question based on the classification data of the information items; identify one or more consultants for the question among a plurality of candidates in accordance with a comparison of the question profile and respective user profiles of the candidates; and submit the question to at least one of the consultants for answer.

In some embodiments, a computer readable storage medium having stored therein instructions, which when executed by one or more processors of a server system, cause the server system to: receive a request from a consultant at a respective client, the consultant having a user profile; access a pool of questions, stored in memory, submitted by one or more inquirers, each question having a question profile determined in accordance with information items associated with the question; select one or more questions for the consultant from the pool of questions in accordance with a comparison of their respective question profiles and the consultant's user profile; and send the selected questions to the respective client for display to the consultant.

BRIEF DESCRIPTION OF THE DRAWINGS

FIGS. 9A and 9B are block diagrams illustrating exemplary screenshots of displaying questions and answers to an inquirer in accordance with some embodiments.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1:
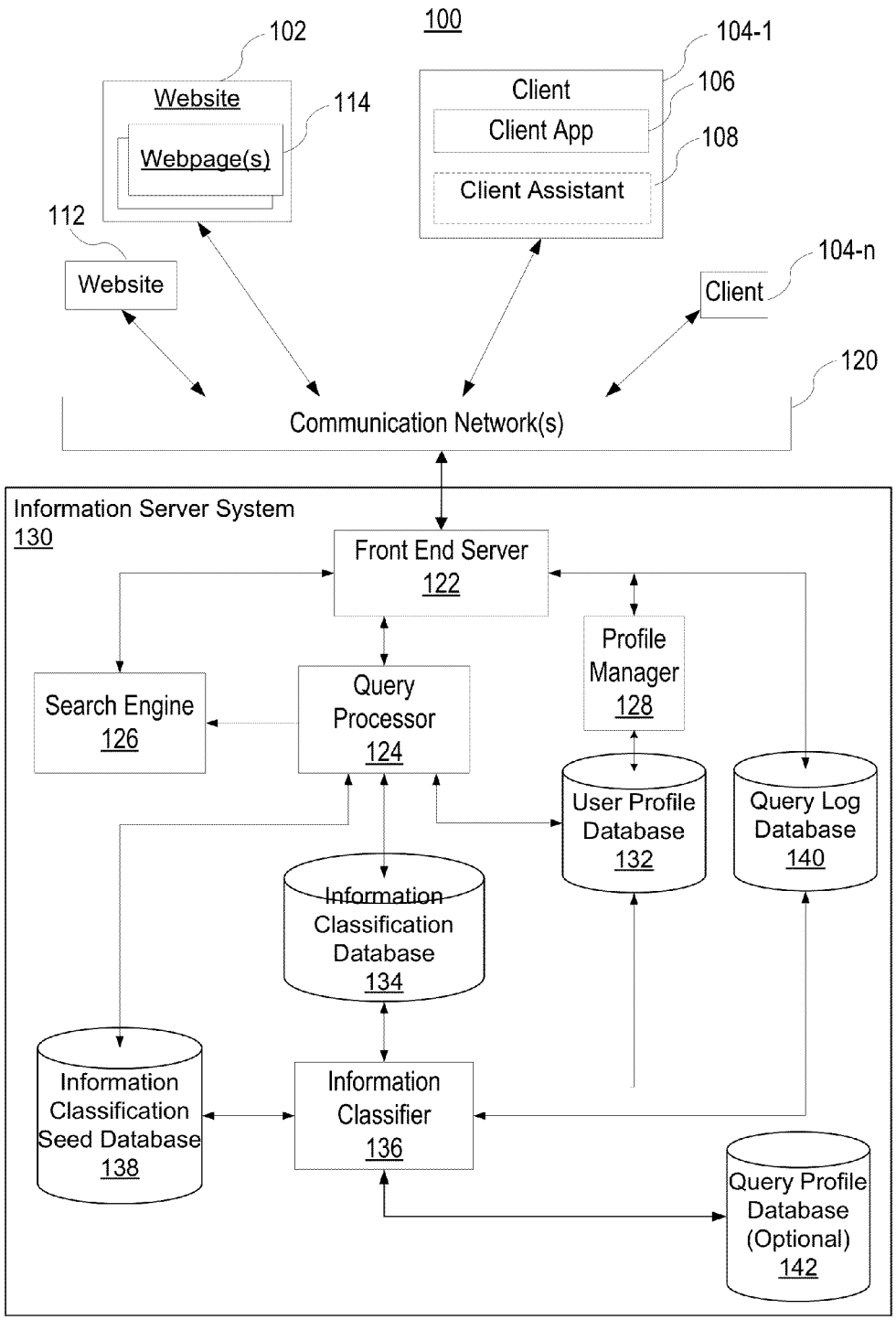
FIG. 1 is a block diagram of a distributed client-server computing system including an information server system according to some embodiments of the invention.

FIG. 1 is a block diagram of a distributed client-server computing system 100 including an information server system 130 according to some embodiments of the invention. The information server system 130 is connected to a plurality of clients 104 and websites 102 through one or more communication networks 120.

A website 102 may include a collection of web pages 114 associated with a domain name on the Internet. Each website (or web page) has a content location identifier, for example a universal resource locator (URL), which uniquely identifies the location of the website on the Internet.

The client 104 (sometimes called a "client system," or "client device" or "client computer") may be any computer or similar device through which a user of the client 104 can submit service requests to and receive search results or other services from the information server system 130. Examples include, without limitation, desktop computers, laptop computers, tablet computers, mobile devices such as mobile phones, personal digital assistants, set-top boxes, or any combination of the above. A respective client 104 may contain at least one client application 106 for submitting requests to the information server system 130. For example, the client application 106 can be a web browser or other type of application that permits a user to search for, browse, and/or use information (e.g., web pages and web services) at the website 102. In some embodiments, the client 104 includes one or more client assistants 108. The client assistant 108 can be a software application that performs one or more tasks related to assisting a user's activities with respect to the client application 106 and/or other applications. For example, the client assistant 108 may assist a user at the client 104 with browsing information (e.g., files) hosted by a website 102, processing information (e.g., search results) received from the information server system 130, and monitoring the user's activities on the search results. In some embodiments the client assistant 108 is embedded in one or more web pages (e.g., a search results web page) or other documents downloaded from the information server system 130. In some embodiments, the client assistant 108 is a part of the client application 106 (e.g., a plug-in of a web browser).

The communication network(s) 120 can be any wired or wireless local area network (LAN) and/or wide area network (WAN), such as an intranet, an extranet, the Internet, or a combination of such networks. In some embodiments, the communication network 120 uses the HyperText Transport Protocol (HTTP) and the Transmission Control Protocol/Internet Protocol (TCP/IP) to transport information between different networks. The HTTP permits client devices to access various information items available on the Internet via the communication network 120. The various embodiments of the invention, however, are not limited to the use of any particular protocol. The term "information item" as used throughout this specification refers to any piece of information or service that is accessible via a content location identifier (e.g., a URL) and can be, for example, a web page, a website including multiple web pages, a document including an image, a video/audio stream, a database, a computational object, a search engine, or other online information service.

In some embodiments, the information server system 130 includes a front end server 122, a query processor 124, a search engine 126, a profile manager 128, an information classifier 136, a query log database 140, a user profile database 132, an information classification seed database 138, and an information classification database 134. In some embodiments, the information server system 130 also includes a query profile database 142, while in some other embodiments this database 142 is not needed because query profiles are not retained after they are used to "spread" classification information across the search results of the corresponding queries. The information server system 130 receives queries from clients 104, processes the queries to produce search results, and returns the search results to the requesting clients 104. The search results for a respective query (sent by a requesting client 104, or a respective requestor at a client 104) are further processed based at least in part on the information classification data from the information classification database 134 and a user profile of the query requestor obtained from the user profile database 132 to produce an ordered set of search results to be returned to the requesting client 104.

The front end server 122 is configured to receive a query from a client 104. The query is processed by the search engine 126 and the query processor 124 to produce a set of search results. The query processor 124 is configured to use the classification data stored in the information classification database 134 and user profile information stored in the user profile database 132 to determine the order of the search results for display. Optionally, the query processor 124 is implemented as part of the search engine 126; alternately, the query processor 124 is implemented as a separate server or set of servers.

After receiving the search results from the information server system 130, the client 104 displays the search results to a user. In some embodiments, the client assistant 108 monitors the user's activities on the search results and generates corresponding search results usage data. The search results usage data may include one or more of the following: user selection(s) of one or more search results (also known as "click data"), selection duration (amount of time between user selection of a URL link in the search results and user exiting from the search results document or selecting another URL link in the search results), and pointer activity with respect to the search results. In some embodiments, the search results usage data is sent to the information server system 130 and stored, along with impression data, in the query log database 140 to update the user profile database 132 and the information classification database 134. Impression data for a historical search query typically includes one or more scores, such as an information retrieval score, for each listed search result, and position data indicating the order of the search results for the search query, or equivalently, the position of each search in the set of search results for the search query.

The query log database 140 stores historical query information including, for a respective query, the query terms of the query (206, FIG. 2A), search results (210-1, FIG. 2A), impression data (e.g., one or more information retrieval (IR) scores of the search results, and position data of the search results (indicating the order of the displayed search results), and click data of the search results (user selections of the search results). In some embodiments, the historical query information stored in the query log database 140 for a respective query also includes user navigation statistical data for the search results. Optionally, the historical query information for a respective query further includes other information, such as location information (e.g., city, state, country or region) for the search requestor and the language of the query. The queries for which information is stored in the query log database 140 are queries from a community of users, such as all users of the corresponding search engine 126. In some embodiments, the system includes multiple query log databases, or the query log database 140 is partitioned, with each query log database or partition storing records corresponding to queries received from a respective community of users, such as all users submitting queries in a particular language (e.g., English, Japanese, Chinese, French, German, etc.), all users submitting queries from a particular country or other jurisdiction or from a certain range of IP addresses, any suitable combination of such criteria.

The user profile database 132 stores a plurality of user profiles, each user profile corresponding to a respective user. In some embodiments, a user profile includes multiple sub-profiles, each classifying a respective aspect of the user in accordance with predefined criteria. In some embodiments, a user profile corresponds to a group of users (e.g., users sharing a particular client 104, or all the users who access the search engine from a particular website or web page). The user profile database 132 is accessible to at least the query processor 124 and the profile manager 128. The profile manager 128 creates and maintains at least some user profiles for users of the information server system 130. As described in more detail below, the profile manager 128 uses the user's search history stored in the query log database 140 to determine a user's search interests. Optionally, records of other online history activities are used to determine a user's interests, and to use that information to supplement the user's search interests as determined from the query log database 140.

The information classification database 134 stores classification data of various information items on the Internet and is accessible to at least the query processor 124 and the information classifier 136. As will be discussed below in conjunction with FIG. 5A, the information classifier 136 is configured to classify or categorize the information items and store the classification data in the information classification database 134. In some embodiments, the information classifier 136 generates classification data for those not-yet-classified information items using the historical query information (e.g., impression data and results usage data) stored in the query log database 140 and the classification seed data of some classified information items stored in the information classification seed database 138.

The information classifier 136 relies on the historical query information in the query log database 140 to build and maintain the information classification database 134. As will be described below with reference to FIG. 3C, the information classifier 136 is also configured to generate user profiles information using the historical query information and the classification data in the information classification database 134.

Figure 2A:
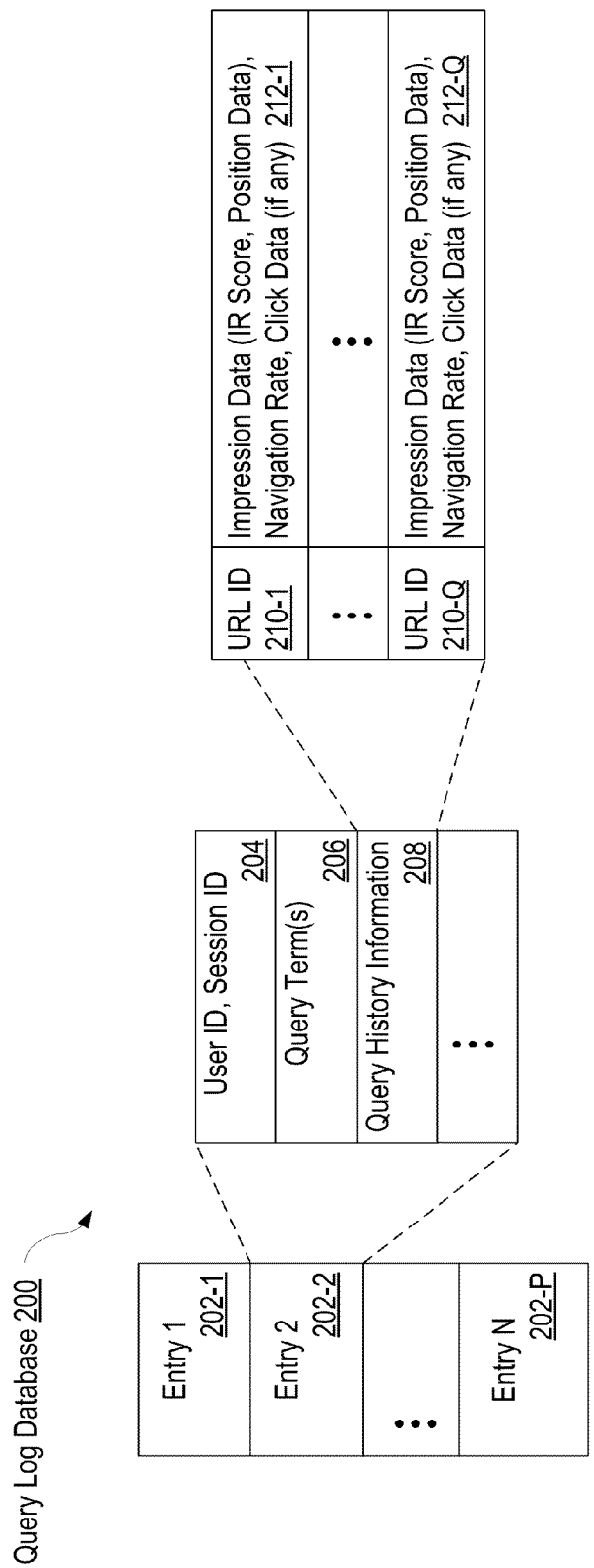
FIG. 2A is a block diagram of a data structure used by a query log database to store historical query information for a set of users in accordance with some embodiments.

FIG. 2A illustrates a data structure 200 for storing historical query information concerning a set of users in accordance with some embodiments. The data structure 200 includes a plurality of query records 202-1-202-N, each corresponding to a query submitted by a respective user at a respective time from a respective location for which the information server system 130 maintains the query-related information. In some embodiments, a query record 202 may include one or more of the following: user ID (identifying the user who submitted the query corresponding to the record 202) and session ID 204; query terms 206 of the query; and query history information 208 that includes a plurality of URL IDs (e.g., 210-1 ... 210-Q) representing the search results for the query, and additional information (212-1 ... 212-Q) for the URL IDs in the search results. In some embodiments, the query record 202 for a respective query only stores information for the top Q (e.g., 40 or 50) search results, even though the query may generate a much larger number of search results.

In some embodiments, the additional information for a respective URL ID in the query history information includes impression data (e.g., the IR (information retrieval) score of the URL, which is a measure of the relevance of the URL to the query, and the position of the URL in the search results); the navigation rate of the URL (the ratio between the user selections of the URL and the user selections of all the URLs in the search results for the same query during a particular time period, such as the week or month preceding submission of the query); and click data indicating whether the URL has been selected by a user among all the URLs. Note that the navigation rate of a URL indicates its popularity with respect to the other URLs among users who have submitted the same query. Optionally, the additional information associated with a URL identifies information items that contain the URL, such as other web pages, images, videos, books, etc. In some embodiments, a query record 202 also includes the geographical and demographical information of a query like the country/region from which the query was submitted and the language of the query. For example, for the same set of query terms submitted from different countries or at different times, the search results may be different. As will be explained below, the information in the query log database can be used to generate accurate classification data for large numbers of URLs.

The user ID 204 is a unique identifier for identifying the user (sometimes, the client) that submits the query. In many embodiments, to protect privacy of the system's users, the user ID 204 uniquely identifies a user or client, but cannot be used to identify the user's name or other identifying information. The same applies to the user ID 244 of the user profile record 242 discussed below with respect to FIG. 2D. In some embodiments, a network communication session is established between the client 104 and the information server system 130 when the user first logs into the information server system or re-logs into the system after the previous session expires. In either case, a unique session ID 204 is created for the session and it becomes part of the query record 202. The query terms 206 may be those terms originally submitted by the user or canonical versions of those terms adopted by the server system.

For each query, the information server system 130 identifies a set of search results corresponding to the query. A search result is typically comprised of a URL (or an IP address), a snippet of text from the web page identified by the URL, and other auxiliary items. The set of search results is ordered in accordance with their respective relevance to the query such that more relevant results are displayed before the less relevant ones. For example, a set of 45 search results is broken into five result pages if there is a limit to displaying no more than 10 results per page. The results displayed on the first result are deemed to be more relevant to the query than the results on the second page and are therefore displayed first. In some embodiments, a displayed search result page is also referred to as an impression of the search results. Within one result page or one impression of search results, the position at or near the top of the browser window is reserved for more relevant results because it usually receives more attention than the other spots in the window.

At the client 104, the client assistant 108 monitors the user's activities on the displayed search results such as the impressions visited by the user, the amount of time the user spends on different search results (e.g., by tracking the position of the user's cursor over the search results), and the URL links clicked by the user. This user interaction information and other data characterizing the usage of the search results is sent back to the information server system 130 and stored in the data structure 200 (in the query history information 208) along with the corresponding URL ID 210.

Figure 2B:
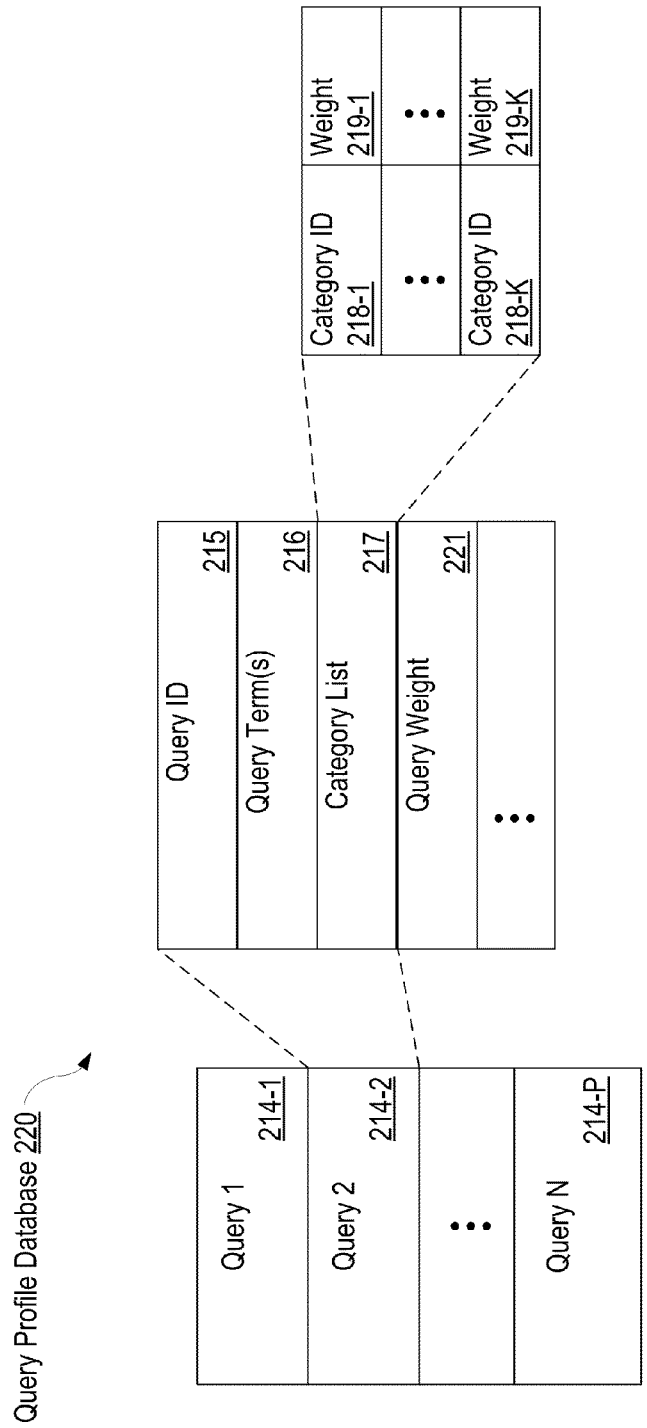
FIG. 2B is a block diagram of a data structure used by a query profile database to store information for a set of query profiles in accordance with some embodiments.

FIG. 2B depicts a block diagram of an exemplary data structure 220 for storing query profiles in accordance with some embodiments. Similar to the data structure 200 in FIG. 2A, the data structure 220 includes a plurality of query profile records 214-1 to 214-P, each of which corresponds to a user-submitted query. When the same query is submitted by many users, a single query profile 214 stores profile information for the query. In some embodiments, each query profile record 214 contains a query ID 215 that identifies a particular query, the set of corresponding query terms 216 in the query, and a category list 217 for classifying the query. Optionally, the query profile 214 may be assigned an overall query weight 221, which not only reflects the sum of the weights of the categories in the category list 217, but also one or more additional factors or metrics that indicate how reliably or how strongly the query profile is correlated with the profiles of the search results. This is discussed in more detail below.

In some embodiments, the category list 217 includes one or more pairs of (category ID 218, weight 219). The category ID 218 may correspond to a particular type of information such as news, sports, travel, finance, etc., and the weight 219 is a number that measures the relevance between the query and the corresponding type of information. For example, the query term "golf" may have relatively high weights for the categories of sports and sporting goods, but a low weight for the category of information technology (IT). In some embodiments, the category ID 218 corresponds to a "concept cluster," which may be produced by a clustering process for example, which may or may not be easily labeled with a category name. As will be further described below in connection with FIG. 3A, the information classifier 136 builds the query profiles from the historical query information in the query log database 140 and the classification data from the information classification seed database 138.

In some embodiments described below, individual query profiles 214 are generated, used and then disposed of without storing the query profiles in a database or other collective data structure 220.

Figure 2C:
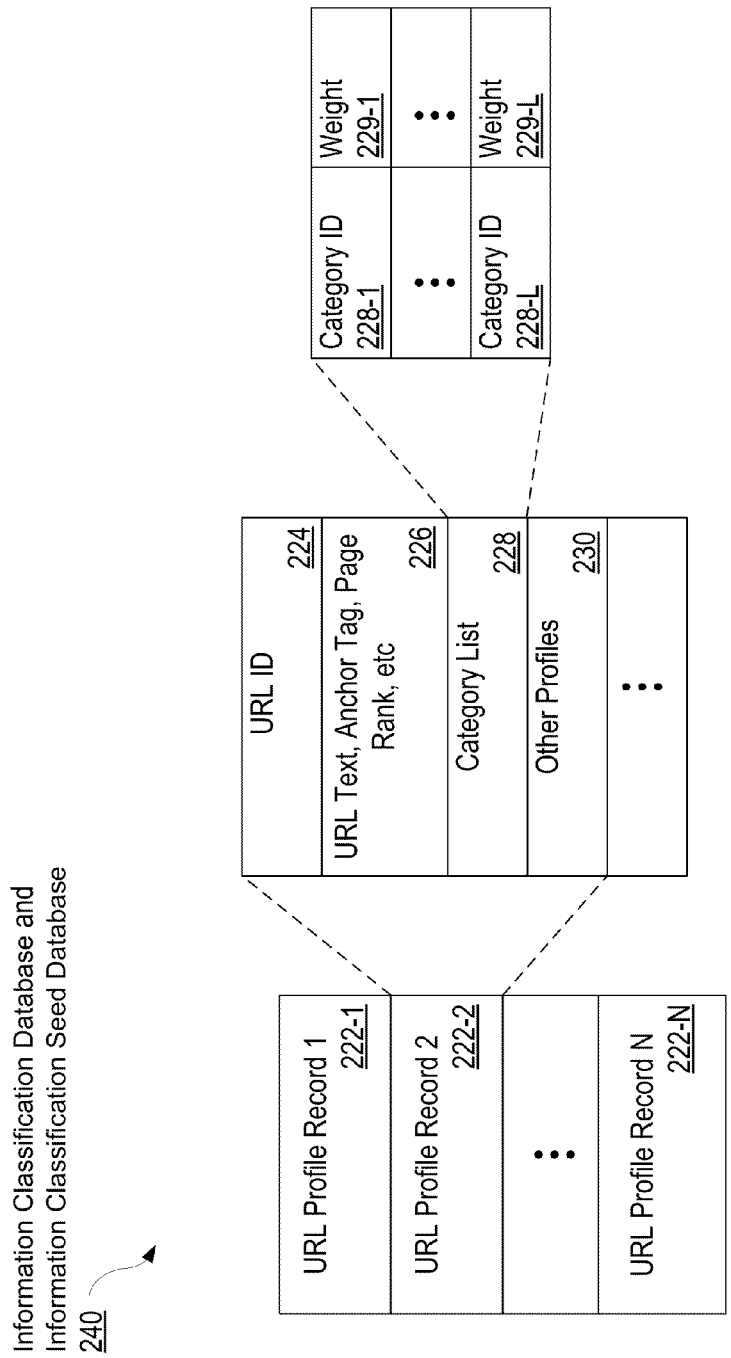
FIG. 2C is a block diagram of a data structure used by an information classification database and an information classification seed database to store information for a set of information items in accordance with some embodiments.

FIG. 2C is a block diagram of an exemplary data structure 240 for storing the classification data of a set of information items in accordance with some embodiments. One instance of this data structure 240 may be used to store classification data for the information classification seed database 138 and another instance of this data structure 240 may be used to store classification data for the information classification database 134.

The data structure 240 includes a plurality of classification data records 222-1 to 222-N (also herein called URL profile records or document profile records), each of which corresponds to an information item on the Internet (e.g., a web page or a website). In some embodiments, each classification data record 222 contains an information item locator such as a URL ID 224, one or more attributes (e.g., URL text, anchor tag, page rank, etc.), a category list 228 for classifying the information item, and optionally, other profiles 230 for classifying the information item. The category list 228 includes one or more pairs of (category ID 228, weight 229). As will be further described below in connection with FIG. 3B, the information classifier 136 generates the classification data for the information items using the historical query information from the query log database 140 and the query profile from the query profile database 142.

Figure 2D:
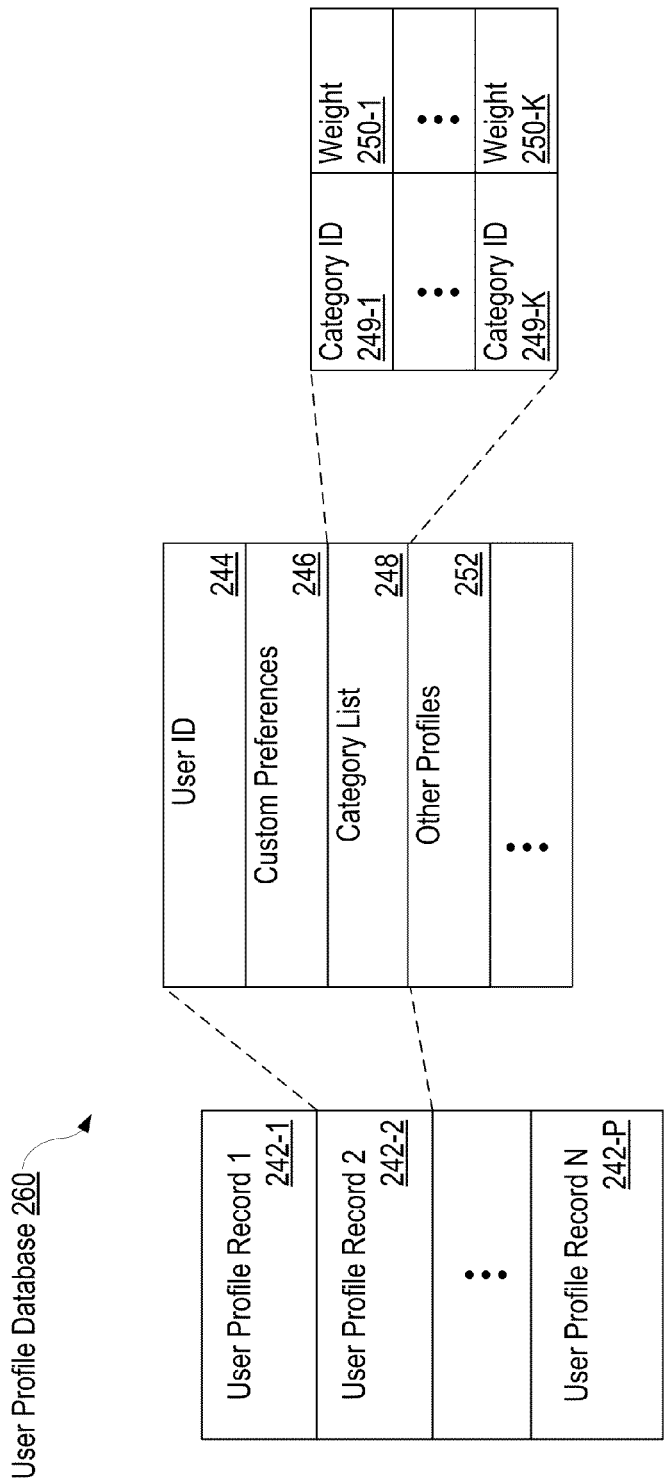
FIG. 2D is a block diagram of a data structure used by a user profile database to store information for a set of user profiles in accordance with some embodiments.

FIG. 2D is a block diagram of an exemplary data structure 260 for storing user profiles for a set of users in accordance with some embodiments. The data structure 260 includes a plurality of user profile records 242-1 to 242-P, each of which corresponds to a particular user (or group of users, as discussed above) of the information server system 130. In some embodiments, each user profile record 242 includes a user ID 244, and a category list 248 that includes one or more pairs of (category ID 249, weight 250) representing the user's search interests. Optionally, the user profile record 242 includes one or more custom preferences 246 (e.g., favorite topics, preferred ordering of search results), which may be manually specified by the user (e.g., using a web form configured for this purpose). In addition, the user profile record 242 may optionally include other types of user profiles that classify the user's search interests from additional perspectives, such as geographic locations, product identifiers, person name, other entity names, dates and times, or any other relevant label or category that can be extracted, inferred or otherwise known from the user's search history. In some embodiments, a user profile may also include categories or topics deduced from one or more of: text and/or correspondence the user has authored (e.g., web pages, blogs, documents, email, chats), web sites the user has visited, and other online activities of the user. It is noted that the user may be required to opt in or accept one or more invitations to various online services in order to have such information included in the user profile. These user profiles may be generated by the profile manager 128 to supplement or replace the category list 248 when needed.

Note that the category list of one web page or query or user may be different from that of another. For example, one web page may have a category of sports and a corresponding weight, while another web page may have nothing to do with sports and therefore may have a completely different set of categories in each category list. In some embodiments, the classification data of different web pages, queries and users are normalized such that, for the same category that appears in the category lists of different entities, their respective weights are comparable. Thus, when a first user's profile has a higher weight for a respective category than a second user's profile, this indicates a higher level of interest by the first user in the respective category than the second user.

Generally, it is possible for an information item such as a website or web page, or for a user to be classified by multiple profiles (230, 252) and/or category lists (228, 248). Different profiles and category lists may characterize the same subject from different angles and therefore have different uses. For simplicity and illustration, the embodiments of the invention assume that an information item corresponds to a web page that is uniquely identified by a URL. Throughout the specification, terms such as "classification data," "profile," "category list," "cluster" and the like are used interchangeably, each of which may be mathematically expressed as a sparse vector. Classification of a web page means generating a category list for the web page. But as noted in the background section, many web pages are either unclassified or misclassified. Therefore, one aspect of the invention is how to "spread" the classification data of classified web pages (e.g., the data stored in the information classification seed database 138) onto those unclassified web pages or websites to generate accurate classification data for the unclassified web pages or websites. Note that this process of spreading classification data does not require a priori knowledge of the content of the unclassified web pages and is therefore computationally efficient.

Figure 3A:
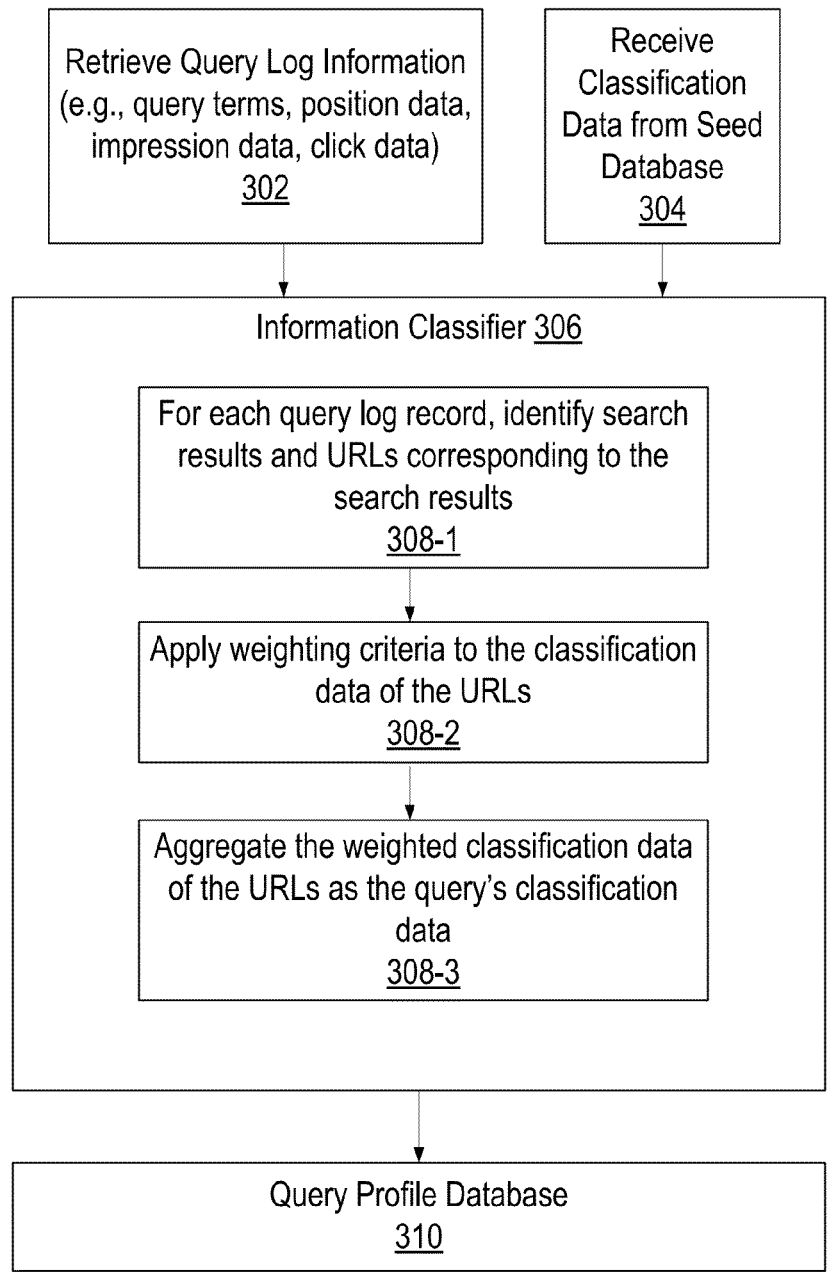
FIG. 3A is a flow diagram illustrating an exemplary process for building the query profile database in accordance with some embodiments.
Figure 3B:
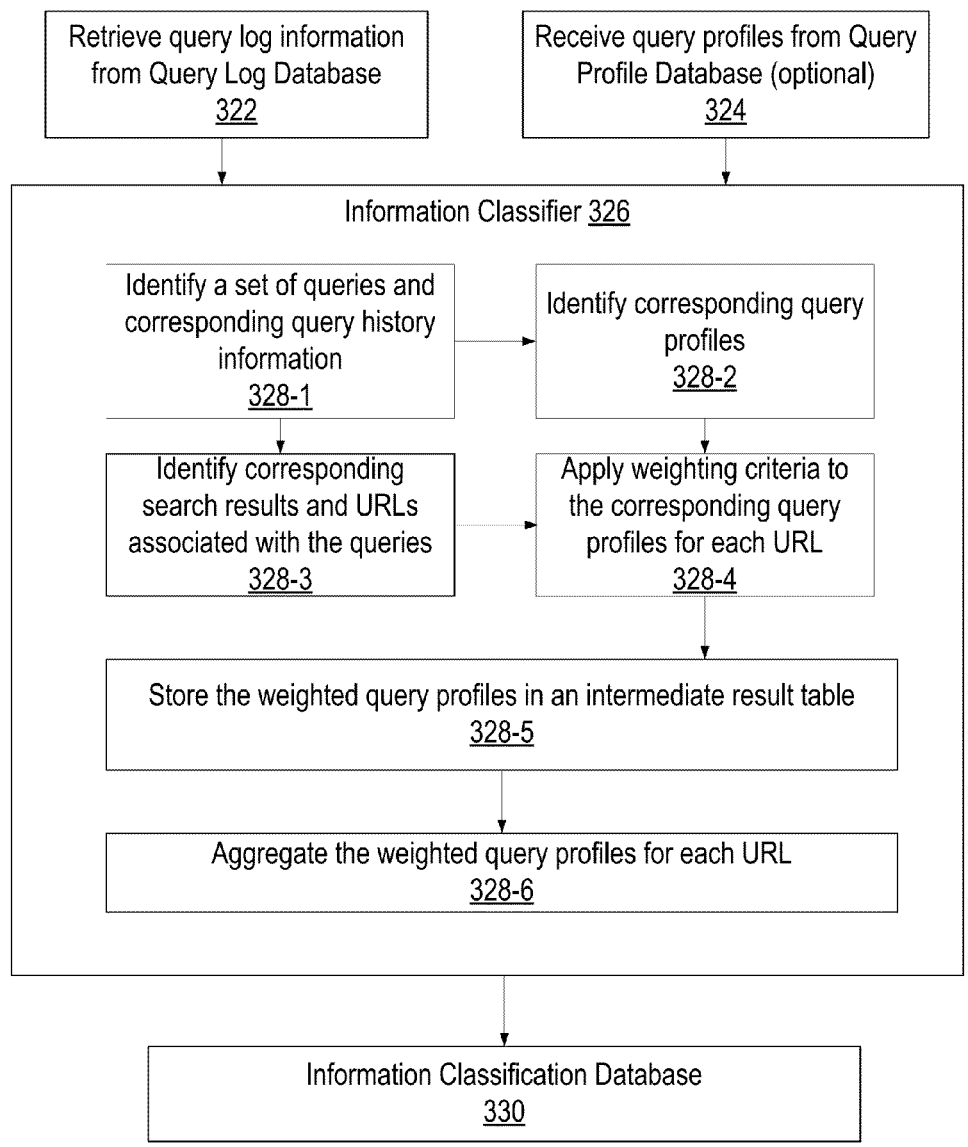
FIG. 3B is a flow diagram illustrating an exemplary process for building the information classification database in accordance with some embodiments.

In some embodiments, the process of spreading classification data from classified web pages to unclassified web pages involves two steps: (i) spreading the classification data from the classified web pages to queries that are related to both the classified and unclassified web pages; and (ii) spreading the classification data from the queries to the unclassified web pages. Note that the term "spreading" describes the process from the perspective of the classification data providers, i.e., the initially classified information items. But from the perspective of the classification data recipients, i.e., the initially unclassified information items, the process is a two-step aggregating operation: (i) aggregating the weighted contributions of classification data from different classified web pages to the same query as the query's classification data; and (ii) aggregating the weighted contributions of classification data from different queries to the same unclassified web page as the web page's classification data. FIGS. 3A and 3B are flow diagrams illustrating the two-step process in more detail.

In particular, FIG. 3A is a flow diagram illustrating an exemplary method 300 for building the query profile database 142 in accordance with some embodiments. The method uses the historical query information from the query log database 140 and the classification data from the seed database 138 to profile a set of queries submitted by a plurality of users during a period of time (e.g., the last six months). Each of the methods described herein may be governed by instructions that are stored in a computer readable storage medium and that are executed by one or more processors of one or more servers or clients. Furthermore, each of the operations shown in FIGS. 3A-3C may correspond to instructions stored in a computer memory or computer readable storage medium.

In some embodiments, the historical query information includes query terms, search results corresponding to the query terms, impression data (e.g., scores, position data) for the search results, and information tracking user interactions with the search results (such as click data). The classification seed data includes a plurality of sparse vectors, each of which provides clustering information of a particular web page (or web site). These sparse vectors are initial estimates of the web pages' relevance to various subjects, topics or concept clusters. Many approaches known in the art (e.g., analysis of a web page's content, key terms, and/or links) can be used to generate these sparse vectors. As initial estimates, these sparse vectors may not be perfectly accurate or complete. As will be described below, the two-step process of generating classification data can be an iterative process in some embodiments. An iterative spreading of the classification data can not only generate classification data for those unclassified web pages but can also update the classification data for previously classified web pages, including those initially classified web pages whose data has been used as seed data.

The historical query information from the query log database 140 that is used to generate classification data for a set of URLs corresponds to historical queries from a community of users. The community of users may be all users of the search engine associated with the query log database 140, or it may be a subset of all users of the search engine, such as users who submit queries in a particular language, users from a particular jurisdiction or geographic area, users who submit queries from a particular range of IP addresses, or any suitable combination of such criteria.

Using query log information retrieved (302) from the query log database 140 and the classification data retrieved (304) from the seed database 138 as input, the information classifier 136 generates (306) the query profiles for user-submitted queries. For illustration, this document describes embodiments in which the classification data in the seed database 138 is classification data for a plurality of URLs. However, in other embodiments the seed classification data is not limited to classification data for URLs. For example, the seed classification data in the database 138 may include classification data for websites (which could be called website-level classification data, in contrast to URL-level classification data).

As long as the seed classification data is reasonably accurate and there is a sufficient amount of query log data, the information classifier 136 can spread the seed classification data accurately and broadly to generate classification data for a large number of URLs that have not been accurately profiled by conventional approaches.

First, the information classifier 136 selects a query log record (having a set of query terms) in the query log database 140. For a respective query, the information classifier identifies (308-1) the search results and the URLs corresponding to the search results. If the same query appears in multiple query log records, representing different search requests from different users and at different times, there may be differences between the corresponding search results. In some embodiments, by grouping the search results together and analyzing the corresponding query logs, the information classifier selects a set of URLs whose associated web pages are deemed to be relevant to the query. Note that the terms "URL," "web page," and "search result" are often used interchangeably throughout the specification because of the one-to-one mapping between the three terms.

After identifying a set of URLs (308-1) for the query log record being processed, the information classifier 136 applies (308-2) weighting criteria to the classification of the identified URLs. The weighting criteria are used for estimating the relevance of each of the URLs to the query. In some embodiments, the weighting criteria include the IR score, navigation rate, impression, position and click data for the URL. These weighting criteria are used to determine a weight (or score) corresponding to the relevance of the URL to the query. For example, a URL that appears at or near the top of the search results corresponding to a particular query is deemed to be more relevant to the query than other search results appearing lower in the search results. Similarly, a URL that has a high navigation rate, i.e., has historically been selected at a high rate by users who submitted the same query, is also given more weight when considering its relevance to the query than a URL (at a similar position in the search results) having a lower navigation rate. Thus, the seed classification data of the URL is considered to be highly relevant to the query and is therefore given more weight in generating the query profile. In some embodiments, a small number of most relevant URLs (e.g., the top two, three or four URLs on the first page of the search results) are given a full weight of 1, and the weights of those less relevant URLs are gradually reduced as a function of their respective search result positions, IR scores, navigation rates, click data, and potentially other URL-specific parameters as well.

As noted above, click data may be used to modify the weights assigned to URLs based on search result position. For example, search results that have been selected for viewing by the user may be assigned the highest possible weight (e.g., the same weight as the highest ranked search result). Alternately, the weights of search results that have been selected for viewing by the user may be given a predefined boost (e.g., as either a fixed increase, or a percentage increase); optionally, a ceiling may be applied to limit the resulting weight so as to not exceed a predefined maximum weight.

Next, the information classifier aggregates (308-3) the weighted classification data of the URLs as the query's own classification data, i.e., the query's profile. Because of the previous weighting step, the query's profile should be more similar to the classification data of those URLs with higher weights. It is noted that URL's (in the search results) for which there is no seed classification data have no influence on the profile of the query. Although this process of spreading classification data from the URLs to the queries may not explicitly consider the content of the web pages identified by the URLs and its relevance to the query, it should be noted that the historical query information, such as impression data (e.g., IR score, position data) and click data of the search results, already includes the influence of the web page's content.

As described above, the aggregation operation 308-3 only uses classification from URLs that have been classified, and thus have classification data in the seed database 138, when generating the query profiles. However, in some embodiments, during a subsequent iteration of the query profile classification process 300, the "seed data" for the query classification process can be the classification data for URLs classified during an earlier iteration of the URL classification process 320 (described below). In other words, during subsequent iterations of the query classification process 300, the seed database 138 may be replaced by the information classification database 134 (or a subset of that database) generated during an earlier iteration of the URL classification process 320.

Finally, in some embodiments the information classifier stores (310) the generated query profiles in the query profile database 142. In these embodiments, the spreading process first generates query profiles from the classification data of the classified URLs, as described above in connection with FIG. 3A, and then generates classification data of the unclassified URLs from the query profiles, as described below in connection with FIG. 3B.

Figure 7:
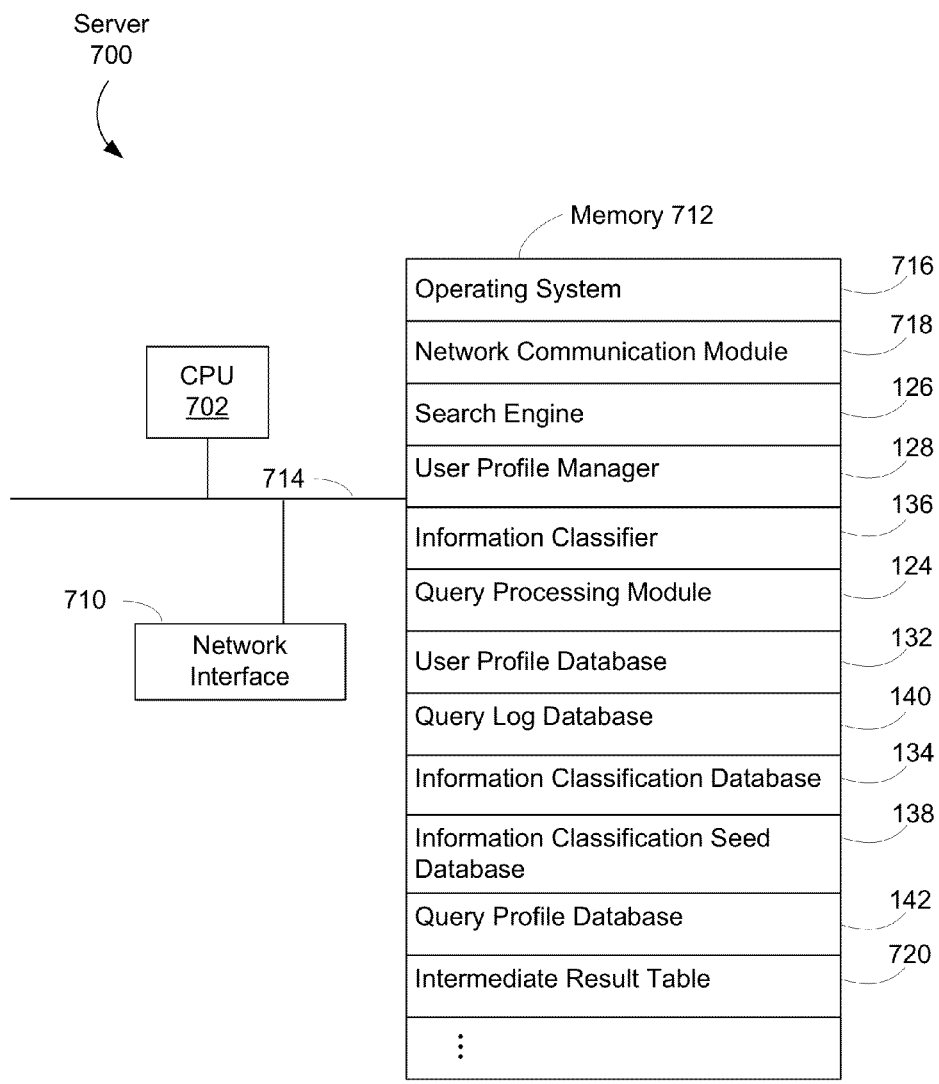
FIG. 7 is a block diagram of an exemplary server system in accordance with some embodiments.

In other embodiments, after each query profile is generated, weighted copies of the query profile (e.g., one for each search result listed in the query log record corresponding to the query profile) are written to entries in an intermediate result table (720, FIG. 7). Optionally, the query profile is not stored in a query profile database, as it is no longer needed for spreading information to URLs associated with the corresponding query log record. In these embodiments, after all the query log records have been processed, the entries for each URL in the intermediate result table are aggregated to produce a respective profile for each URL for which sufficient classification information has been written to the intermediate result table. A control flow representation of these embodiments is provided in Table 1. In particular, in a first phase, each query log record is processed to produce a query profile, and then the query profile is "spread" by producing entries in the intermediate result table for each URL listed in the query log record (or, alternatively, each URL in an identified subject of the URLs listed in the query log record). Each entry stored in the intermediate result table (for the query log record being processed) corresponds to a particular URL of the search results listed in the query record, and contains a weighted version of the query profile. In the entry corresponding to a particular URL and a particular query, the weight given to the query profile is based on the relevance of the URL to the query, as explained in more detail above. In a second phase, after the intermediate result table has been populated with entries from the processing of the query log records, the entries for each URL are aggregated to produce classification data for that URL, and the resulting classification data for each URL is stored in a classification database. As explained in more detail elsewhere, if the number of entries for a URL is smaller than a threshold value, or other quality criteria are not satisfied, classification data for a URL is either not generated or not stored in the classification database.

TABLE 1

```
// First Phase //
For each query log record {
    generate query profile by aggregating seed classification data for URLs
        listed in the query log record (see description of FIG. 3A);
    optionally, the query profile is not stored in a query profile database;
    For each URL listed in the query log record (alternatively: For each
    URL in an identified subset of the URLs listed in the query log record) {
        generate an entry (keyed by the URL) in the intermediate result
        table, which is a weighted version of the query profile for the
        query log record (see description of operation 328-5, FIG. 3B);
    }
}
// Second Phase //
For each distinct URL in the intermediate result table {
    aggregate the weighted query profiles for that URL to generate
    classification data for the URL (see description of operation 328-6,
    FIG. 3B); store the classification data for the URL in an information
    classification database (see description of operation 330, FIG. 3B);
}
```

In any of these embodiments, the process of generating classification data for URLs may either be performed for all URLs listed in the query log records, including both classified and unclassified URLs, or alternately, the process may generate classification data only for unclassified URLs (in which case the seed classification data for the classified URLs remains the classification data for those URLs). Alternately, classification data may be generated for other subsets of the URLs listed in the query log records, based on various selection criteria.

Referring now to FIG. 3B, based at least in part on the query log information retrieved (322) from the query log database 140 and the query profiles retrieved (324) from the query profile database 142, the information classifier 136 generates/updates (326) the classification data for web pages identified by URLs found in the search results. First, the information classifier 136 identifies (328-1) a set of queries and corresponding query histories from the query log database 140. Note that this set of queries can be the same set of queries the information classifier 136 previously identified and each query has an associated query profile in the query profile database 142. Each of the queries is associated with a plurality of search results, some of which are classified (e.g., have classification data in the seed database 138) and some of which are not.

The information classifier 136 then identifies (328-2) from the query profile database 142 the query profiles corresponding to the set of queries. These query profiles are used for generating/updating the classification data of at least some URLs found in the search results. As noted above, the profile of a query is built at least in part on the classification data of different URLs in different sets of search results that correspond to the same query. But their contributions may vary depending on each URL's relevance to the query in a particular set of search results. As noted above, the aggregation of URL classification data to produce a query profile is weighted in accordance with the IR scores, navigation rates, search results positions and click data of the URLs in the search results of the query.

Reciprocally, the classification data of a URL may be derived at least partially from the profiles of the queries in which the URL is listed as a search result. In some embodiments, the contributions from these query profiles to the classification data of the URL are dependent on the URL's relevance to each of the queries, as indicated by the search result position data and click data for the queries. For example, assume that a URL appears in the search results corresponding to two different queries A and B. For query A, the URL appears at the top of the search results and is also selected by the user; for query B, the same URL is on the fifth page of the search results and is never selected or viewed by the user. Such weighting information is identified (328-3) or derived from the corresponding query log information. When determining the contributions of the two query profiles to the classification data of the URL, the information classifier 136 applies (328-4) the weighting criteria to them such that query A's profile is given more weight over query B's profile, provided that any other weighting factors associated with the two queries are substantially the same.

In some embodiments, the information classifier 136 stores (328-5) the weighted query profiles in an intermediate result table. Each entry in the intermediate result table represents, for a given URL, the contribution of one weighted query profile to the classification data for that URL. There is a many-to-many mapping between query IDs and URL IDs in the table. For a given query ID, a set of URL IDs can be found in the table, each URL ID corresponding to a weighted version of the query profile. For a given URL ID, a set of entries can be found in the table, one for each query for which the URL ID appears in the search results. Stated in another way, operation 328-5 is performed by: For each query in the log, storing to the intermediate result table an entry for each URL in the search results; the entry comprising a weighted version of the category list in the query's query profile. This is repeated for each query in the query log, thereby generating a very large number of entries in the intermediate result table. Then, aggregation operation 328-6 is performed by: For each distinct URL in the intermediate result table, aggregate all the entries in the intermediate result table.

In some embodiments, the aggregated classification data for the URLs is normalized so that, 1) for the same category that appears in the category lists of different URLs, their respective weights are comparable; and 2) the total number of queries in which a URL appears in the search results has little or no impact on the strength of the category weights in the classification data (category list) for that URL. For example, as a result of the normalization, the sum of the category weights for a URL appearing in the results of 100 queries in the query log are not lower than the sum of the category weights for a URL appearing in the results of 500 queries in the query log. In some embodiments, if the total number of queries in which a URL appears is below a predefined threshold, a profile for that URL is not produced because there is insufficient data to produce a sufficiently reliable URL. It is noted that a query weight or weighting factor is associated with each entry in the intermediate result table, which is based both on the query profile's total weight and the strength of the linkage between the query and the URL for the entry. When aggregating (328-6) the classification data for a respective URL, the sum of the query weights for the table entries corresponding to the URL is used as a normalization factor (e.g., as a divisor) when determining the final weights 229 (FIG. 2C) of the categories in the URL's profile 222.

In addition, in some embodiments the category 228 (FIG. 2C) list for a respective URL produced by the aggregation operation 328-6 is truncated or filtered, when the list contains more than a predefined number of distinct categories, so as to exclude the lowest weighted category IDs while retaining the highest weighted category IDs having at least a predefined percentage (e.g., 90%) of the total weights of the categories in the unfiltered category list.

Upon completion of the aggregation operation 328-6. The classification data for each URL is stored (330) in the information classification database 134.

As explained above (see Table 1 and the description of the control flow shown in Table 1), in some embodiments, the aforementioned process of spreading the classification data from the classified URLs to the un-classified URLs is implemented on a query record-by-query record basis, without producing a query profile database.

In some embodiments, the number of query terms associated with a query record is also factored into the weighting and spreading of classification data from a query profile to the URLs listed in the search results of the corresponding query record. Generally, the more terms a query has, the more specific the query is and the more focused the search results would be with respect to topicality. Conversely, the fewer terms a query has, the more ambiguous the query is and the more likely that the search results will include results on different topics. For example, the search results corresponding to the single-term query of "jaguar" includes http://www.jaguar.com/global/default.htm, which is the official website of the Jaguar-brand luxury car, and http://en.wikipedia.org/wiki/Jaguar, which is the Wikipedia web page about the large cats known as jaguars. In contrast, the search results corresponding to the two-term query of "jaguar car" still include the official website of the Jaguar-brand luxury car. But these search results will not include the web page about large cats know as jaguars, and instead will include another search result relevant to the Jaguar brand for cars, such as the http://en.wikipedia.org/wiki/Jaguar_Cars, the Wikipedia web page about the Jaguar automobile brand's history.

In some embodiments, the contribution of a query's classification data (also called the query profile) to the classification data of the URLs listed in the search results of the query is weighted in accordance with the number of query terms in the query. For example, the temporary classification data of one-word (or one-character in some Asian languages) query is given the least weight. The more words or characters a query has, the more weight is assigned to its classification data. Thus, the entry in the intermediate result table for a particular URL, with respect to a particular query, will have a more highly weighted copy of the query's classification data when the query contains multiple terms, and will have a lower weighted copy of the query's classification data when the query contains only a single term. Depending on a specific language, the role of the query length in weighing the classification data becomes less important when it reaches a minimum threshold (e.g., two or three words in English and some other languages).

Other measures of the ambiguity or specificity of a query include the distribution of the corresponding classification data. For a specific query, e.g., "jaguar car," most, if not all, of the search results should be limited to one topic, i.e., the luxury car brand. As a result, the temporary classification data of the query derived from the classification data of the corresponding search results will be focusing on the same topic. In contrast, a less specific query like "jaguar" should see the distribution of classification data over at least two topics, the luxury car brand and the big cat. Another way of measuring the ambiguity or specificity of a query is to examine the correlation of the classification data of the URLs in the search results, e.g., by averaging the pair wise cosine similarities of the URLs. Stated another way, the average cosine similarity of the search results corresponds to (or is a metric of) the level of specificity of the search query. For example, the average cosine similarity of the search results is high when the search results are very similar to each other (e.g., most results concern a single major topic), indicating that the search query has high specificity. The more diverse the search results, the smaller the average cosine similarity, indicating that the search query has low specificity.

Figure 3C:
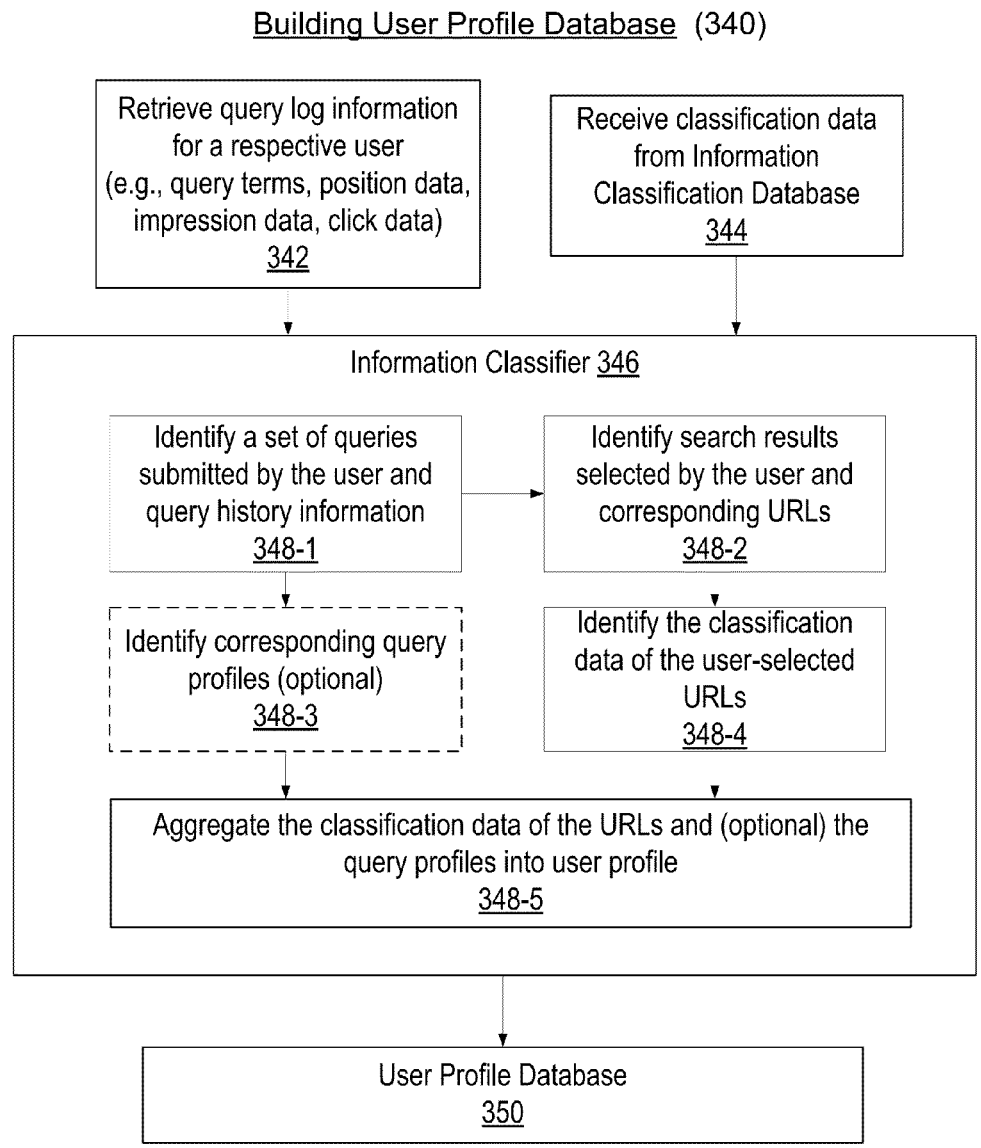
FIG. 3C is a flow diagram illustrating an exemplary process for building the user profile database in accordance with some embodiments.

Like a user's browsing history, the user's search history (such as the queries submitted by the user and the search results selected by the user) is also a good source for profiling the user's search interests. FIG. 3C is a flow diagram illustrating an exemplary process 340 for building a user profile based on the classification data of the search result URLs selected by the user.

Based at least in part on the query log information retrieved (342) from the query log database 140 and the classification data retrieved (344) from the information classification database 134, the information classifier 136 identifies (348-1) a set of queries submitted by a respective user and corresponding query histories from the query log database 140. From the query histories, the information classifier 136 identifies (348-2) the search results selected by the user and the corresponding URLs. For each of the URLs, the information classifier identifies (348-4) its classification data from the database 134.

In some embodiments, the information classifier 136 aggregates (348-5) the classification data of the user-selected search result URLs into a user profile. Note that different weighting or filtering criteria can be used when aggregating the classification data of the URLs. For example, in some embodiments the frequency of a URL being selected by a user is factored into the weight of the URL's classification data. In some embodiments, when two URLs having similar numbers of user clicks, the classification data of a URL for which the user has demonstrated sustained interest (e.g., N user clicks spread approximately evenly over a month), is given greater weight in determining the user's profile than a URL for which a similar number of user clicks are concentrated in a short period of time (e.g., an hour or two). In some embodiments, the time recency of a query is also considered such that the classification data of a URL associated with a more recent query is given more weight than the classification data of a URL associated with a more remote query. In some embodiments, the importance of a particular cluster or category is also taken into account when profiling a user. For example, a common cluster or category for a group of individuals including the user is less helpful in determining the user's interest and should be given less weight than more distinct clusters or categories.

The resulting user profile is then used by the information server system 130 to provide personalized service for the user. For example, in response to a query from the user, the search engine 126 identifies a set of search results and the search results are initially ordered by their relevance to the query. Before returning the search results to the requesting user, the query processor 124 can re-order the search results by comparing each search result's classification data with the user profile. If both are expressed as a sparse vector, the comparison can be determined by computing the cosine or dot product of the two vectors. The search results are then re-ordered based at least partially on their dot products and then transmitted to the client device 104 of the requesting user, for display to the requesting user at the client device 104.

In some embodiments, the information classifier 136 also identifies (348-3) the query profiles of the queries submitted by the user and aggregates (348-5) both the query profiles and the classification data of the user-selected URLs into the user profile and stores (350) the resulting user profile in the database 132.

Note that any of the three methods described above, with reference to FIGS. 3A, 3B and 3C, can be an iterative process. The information classifier begins with the classification data of a limited number of URLs in the seed database 138 and spreads the classification data into a set of query profiles, the classification data of those unclassified URLs, and a set of user profiles. As shown in FIGS. 3A-3C, the historical query information plays an important role in profiling a query, a URL or a user. The process of spreading classification data is an ongoing process, repeated or updated over time, because the query log database keeps accumulating new query log information. The new query histories not only provide more data points to refine the classification data of a URL but also keep track of the dynamic aspect of many users' search interests.

In some embodiments, the information classifier 136 repeats the processes described above to update one or more of the query profile database 142, the information classification database 134, and the user profile database 132. In some embodiments, a subset of the information classification database 134 is chosen as the new seed database 138 to spread the classification data. In some embodiments, the information classification seed database 138 is generated by another clustering method.

In some embodiments, before starting a new round of classification data spreading, the information classifier 136 may refresh the query profile database 142, the information classification database 134, or the user profile database 132 such that no legacy classification data is preserved. In some other embodiments, the information classifier 136 may keep at least a subset of data records in the query profile database 142, the information classification database 134, or the user profile database 132 if these data records are deemed to be still reliable and useful.

In some embodiments, the aforementioned method can be used to profile a website if the classification data of at least a subset of the web pages associated with the website is known. This may be implemented by a straightforward aggregation of the classification data of different web pages. Alternatively or additionally, the classification data of different web pages are weighted in accordance with their respective positions in the website's hierarchy as well as the popularity or user usage data of the corresponding web pages during a particular time period. Stated in another way, when aggregating web page classification data to produce a profile for the website, weights may be given to the classification of web pages within the website in accordance with 1) the number of user clicks on the website's web pages, or 2) the number of director levels between the web page and the website's home page, or both.

In some embodiments, the clusters or categories that are associated with a large portion of web pages at a web site are given relatively higher weights than clusters or categories that are associated with a smaller portion of the web pages at the web site. In some other embodiments, the lack of at least one common cluster or category among at least a minimum number of web pages at a website (e.g., en.wikipedia.com) may prevent the website from being classified.

Figure 3D:
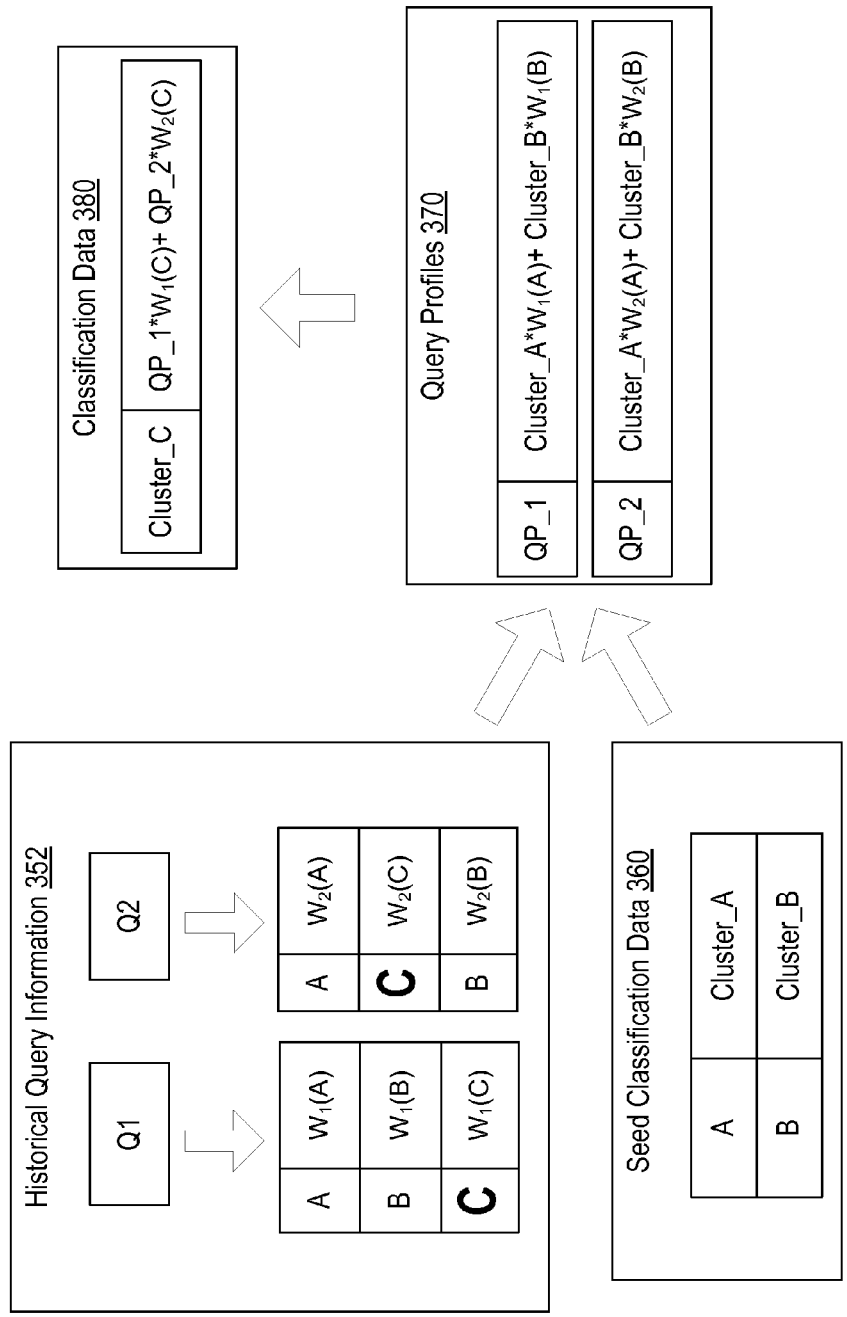
FIG. 3D is a block diagram illustrating an example of classifying an information item using the classification data of other information items in accordance with some embodiments.

FIG. 3D is a block diagram illustrating an example of classifying an information item using the classification data of other information items in accordance with some embodiments.

For illustrative purpose, the historical query information 352 includes two user-submitted queries, Q1 and Q2. But in reality, a large number of query log entries are stored in the query log database 140, each query log entry corresponding to a query submitted by a user during a particular session. The query, comprising one or more query terms, has a corresponding set of search results and user usage data.

For simplicity, each of the two queries Q1 and Q2 is associated with three web pages, A, B, and C, each web page having a weighting factor W indicating the relevance of the web page to the corresponding query. As explained above, the weighting factor may be affected by the corresponding web page's content, its popularity on the Internet, and the associated user usage data such as impression, position and click-through. In this example, it is assumed that two of the three web pages, A and B, have already been classified and their corresponding classification data can be found in the seed classification data 360. The web page C, although being part of the search results, has no associated classification data in the seed classification data 360. But the fact that the web page C appears together with the web pages A and B in the search results corresponding to Q1 and Q2 suggests that it is possible to predict the classification data of the web page C based on at least the seed classification data of the web pages A and B.

In some embodiments, the first step of this prediction, sometimes herein called spreading of the seed classification data, is to build the classification data or profiles for Q1 and Q2. As shown in FIG. 3D, the two query profiles 370, QP_1 and QP_2, are defined as a function of the classification of the two web pages modulated by the corresponding weighting factors. The second step of the prediction is to build the classification data for the unclassified web page C by projecting the two query profiles into the domain of the classification data of the web page C. Because the two weighting factors $W_1(C)$ and $W_2(C)$ indicate, at least in some aspect, the relevance of web page C to the two queries, these weighting factors are used to determine the contribution of the respective query profiles to the classification data of the web page C. It should be noted that the mathematical expressions in the figure or anywhere throughout the specification are for illustrative purposes only. There are other ways of aggregating and weighting the classification data of the web pages A and B in their respective contribution to the composition of the query profiles, as described above in conjunction with FIG. 3A, and there are also other ways of aggregating and weighting the classification data of the query profiles QP_1 and QP_2 in their respective contribution to the classification data for web page C.

It should also be noted that a typical query's search results correspond to hundreds or even thousands of web pages, and the same query, when submitted by different users or even by the same user by at different times, could have slightly different sets of search results. By the same token, the same web page may appear in different sets of search results corresponding to different user-submitted queries and draw different user responses. The example shown in FIG. 3D, i.e., each of the two query profiles is generated from the classification data of two web pages and the classification data of the web page C is generated from two query profiles, is only for illustration.

Given the nature of the many-to-many relationship between queries and web pages, in some embodiments, the information classifier only uses the classification data of a subset of the web pages returned as search results to a query for building the query profiles or uses weighting factors to prioritize one subset (of the web pages returned as query results) over another subset (of the web pages returned as query results). For example, if the number of queries for which a web page appears in the corresponding search results is below a predefined limit, this web page may be skipped in the spreading of classification data. Similarly, the information classifier may consider only the profiles of a subset of the queries for estimating the classification data of an unclassified web page, or may weight one subset over another subset in accordance with predefined heuristics. For example, the spreading of classification data from classified web pages to unclassified web page may be limited to a particular query. In some other embodiments, the scope of spreading may be expanded to cover, e.g., different queries within the same session, or different sessions by the same user, or different queries by the same group of users.

Figure 4:
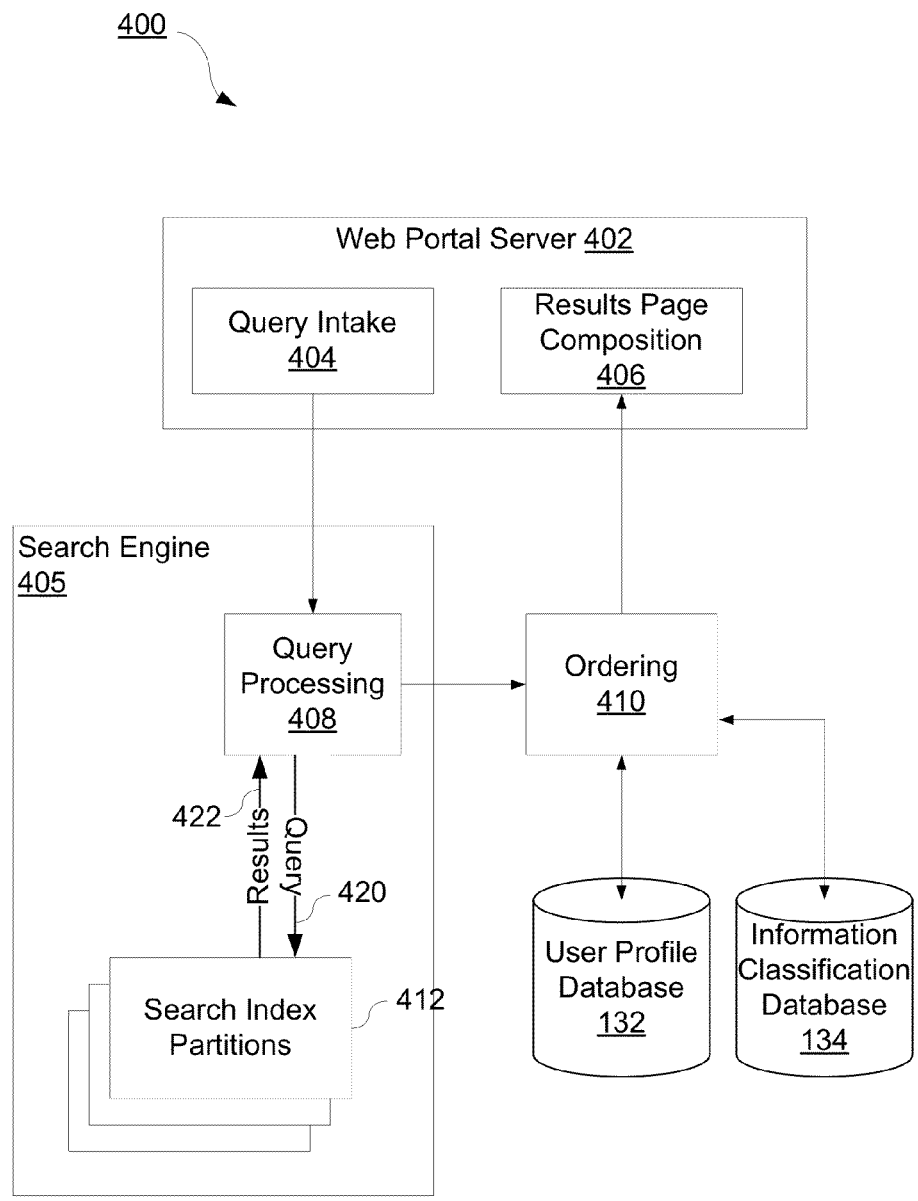
FIG. 4 is a block diagram illustrating an exemplary process for processing a query and ordering the corresponding query results using user profile and information classification data in accordance with some embodiments.

FIG. 4 is a block diagram illustrating an exemplary process 400 for processing a query and ordering the corresponding query results using the user profile and classification data in accordance with some embodiments. A web portal server 402 receives queries through a query intake interface or process 404 and sends to the requesting client 104 results information (which may be formatted as a web page, for example, by a results page composition process or module 406) for display at the client 104. The received request is processed by a search engine 405 to produce a set of search results 422 that match or otherwise satisfy a query 420. The search engine 405 may include one or more query processing modules or processes 408 that controls or oversees the searching of a set of search index partitions 412 for documents or other search results matching the query 420. A list of search results are returned 422 by the search engine, and the search results in the list are then ordered 410 according to the corresponding user profile (from user profile database 132) of the requesting user and the classification data (from information classification database 134) of the search results. Results information, including the ordered search results, is forwarded to the results page composition module 406 for conversion into a format (e.g., a web page or XML document) suitable for sending to the requesting client. In some embodiments, the search engine 405 encompasses all of system components for performing the process 400.

Figure 5A:
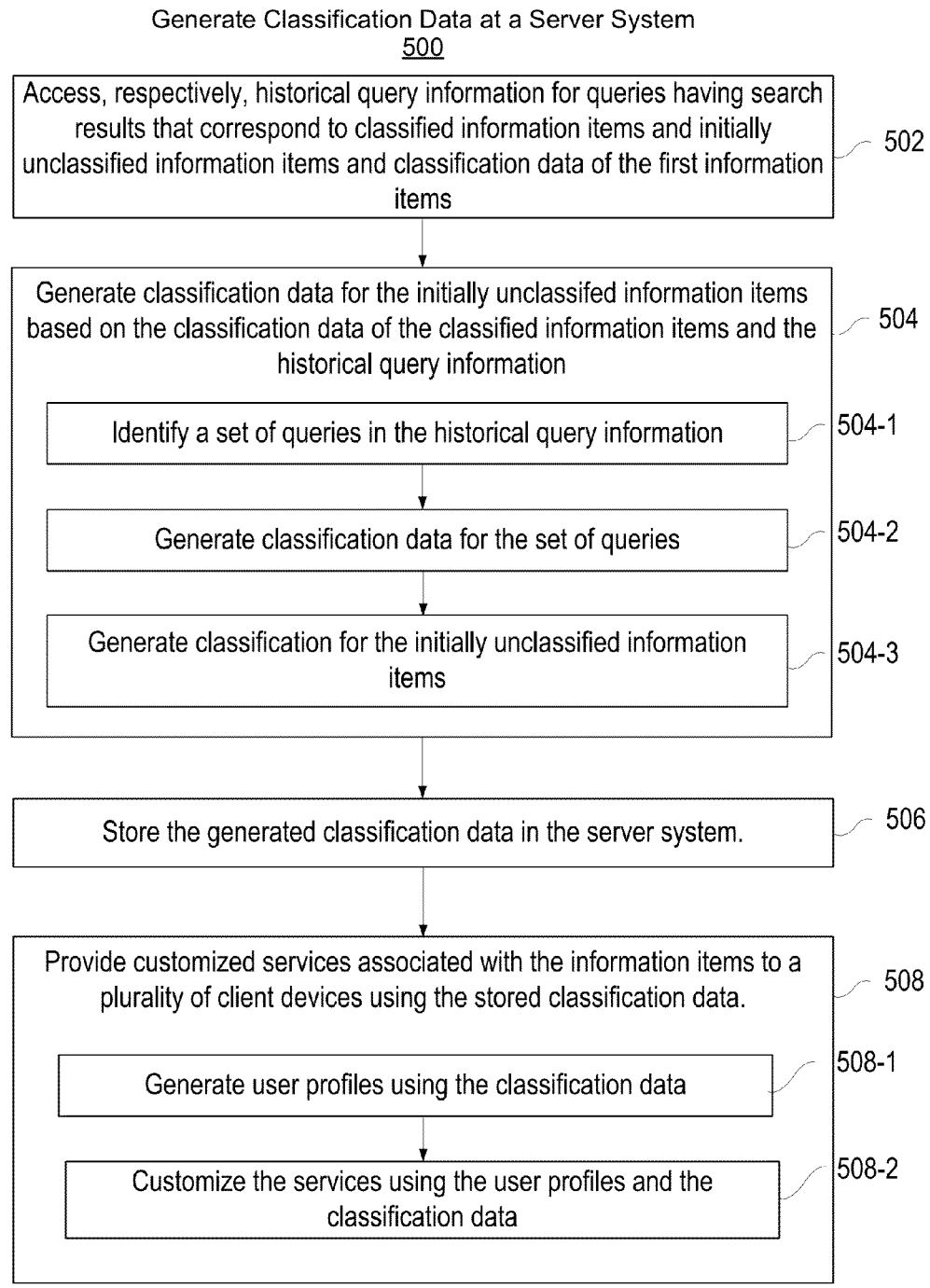
FIG. 5A is a flow diagram illustrating an exemplary process for generating classification data and providing customized services using the classification data in accordance with some embodiments.

FIG. 5A is a flow diagram illustrating an exemplary process 500 for generating classification data and providing customized services using the classification data in accordance with some embodiments. To some extent, this process 500 is a summarization of the three processes separately described above in connection with FIGS. 3A-3C.

At a server system, the process accesses (502) historical query information for queries and their associated search results. For example, the historical query information may correspond to the query histories stored in the query log database. Some of the search results correspond to initially classified information items and others corresponds to initially unclassified information items. For clarity, the initially classified information items are called "first information items" and the initially unclassified information items are called "second information items." From the information classification seed database, the process accesses classification data of the first information items. Using the historical query information and the seed classification data, the process generates (504) classification data for the second information items and stores (506) the generated classification data in the server system such as the information classification database 134 of FIG. 1.

In some embodiments, in order to generate the classification data for an initially unclassified information item, the process identifies (504-1) a set of queries in the historical query information. At least a subset of the queries each has an associated search result corresponding to the initially unclassified information item. The process then generates (504-2) classification data or a query profile for each of the queries based on the classification data of the first information items and the historical query information for the set of queries.

In some embodiments, for each of the queries, the process identifies a set of search results corresponding to the query and a set of the first information items corresponding to the set of search results (e.g., 308-1 of FIG. 3A). Next, the process weights the classification data of the identified first information items in accordance with information such as their respective predefined information retrieval scores, their corresponding search results' positions in the set of search results, and information denoting user interaction with the corresponding search results (e.g., 308-2 of FIG. 3A). Finally, the process aggregates the weighted classification data of the identified first information items to generate the query's classification data, also called its query profile (e.g., 308-3 of FIG. 3A).

Using the query profiles of the identified queries and the historical query information for the queries, the process generates (504-3) classification data for the initially unclassified information items. In some embodiments, this includes identifying a set of queries (e.g., 328-1 of FIG. 3B) and retrieving the corresponding query profiles from the query profile database (e.g., 328-2 of FIG. 3B). For each of the queries, the process identifies a set of search results corresponding to the query (e.g., 328-3 of FIG. 3B). The set of search results includes at least one search result corresponding to the initially unclassified information item. Next, the process weights the classification data or query profile of the query in accordance with information such as the initially unclassified information item's information retrieval score (as generated by the search engine 126 when processing the query to generate search results), its corresponding search result's position in the set of search results, and user interaction (if any) with the corresponding search result (e.g., 328-4 of FIG. 3B). Finally, the process aggregates the weighted classification data of the queries to generate classification data (sometimes called a URL profile) for the initially unclassified (second) information item (e.g., 328-6 of FIG. 3B). The same process can also be performed to generate new classification information for the initially classified (first) information items.

After building the classification data for the first and second information items, the process can provide (508) customized services associated with the first and/or second information items to a plurality of client devices using the corresponding classification data stored in the server system.

In some embodiments, the process generates (508-1) user profiles using the classification data of the first and second information items. In response to a request for service from the user at a client device, the process customizes (508-2) the requested services using the user profiles and the corresponding classification data. To generate a user profile, the process first identifies a set of queries submitted by a user in the historical query information and the corresponding search results (e.g., 348-1, 348-2 of FIG. 3C). The search results correspond to one or more of the first and second information items. The process then identifies the classification data of the user-selected information items and aggregates the classification data of the user-selected information items (e.g., 348-4, 348-5 of FIG. 3C).

In some embodiments, the process performs a user-independent service in response to the service request. The user-independent service generates an initial result that includes one or more of the first and second information items. For each of the information items in the initial result, the process determines a score by comparing the information item's classification data with the user profile and then re-orders the information items in the initial result in accordance with their respective scores so as to generate a customized result. Exemplary services that may be customized include, without limitation, personalized search, target-oriented advertisement or campaign, and individual matching in an online social network, etc.

Figure 5B:
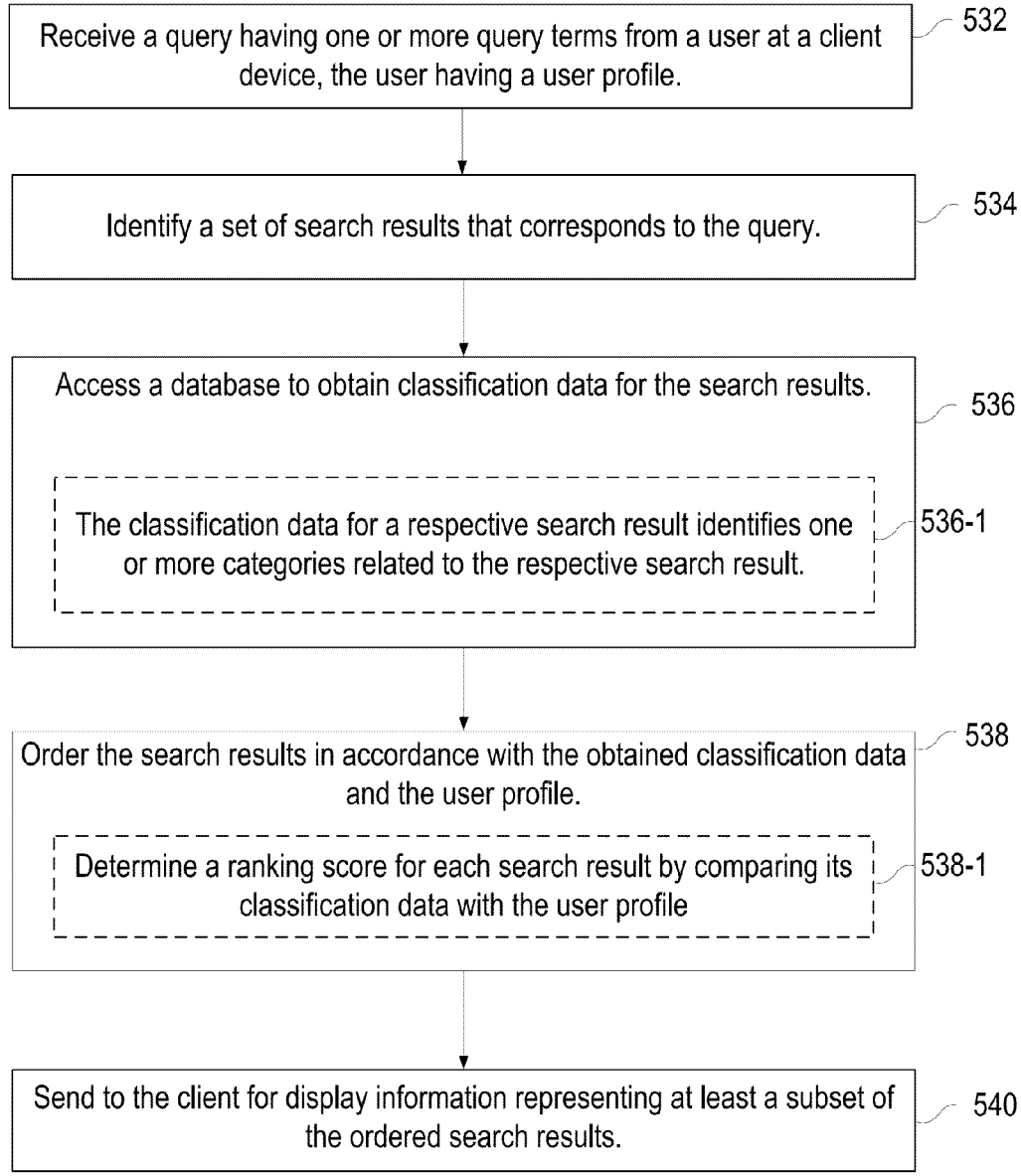
FIG. 5B is a flow diagram illustrating an exemplary process for providing personalized search results for a user at a remote client device using the user's user profile and the classification data in accordance with some embodiments.

FIG. 5B is a flow diagram illustrating an exemplary process for providing personalized search results for a user at a remote client device (remotely located from the information server system) using the user's user profile and the classification data in accordance with some embodiments. After receiving a query from a user at a respective client device (532), the process first identifies a set of search results corresponding to the query (534). At least one of the search results is associated with one of the second information items. The process accesses the information classification database to obtain classification data for the search results (536). The classification data for a respective search result identifies one or more categories related to the respective search result (536-1). Next, the process determines a score for the search result by comparing its classification data with a user profile (538-1) and orders the search result with respect to the other search results in accordance with the determined score (538). Finally, the process sends to the client device, for display at the client device, information representing at least a subset of the ordered search results (540).

Figure 6:
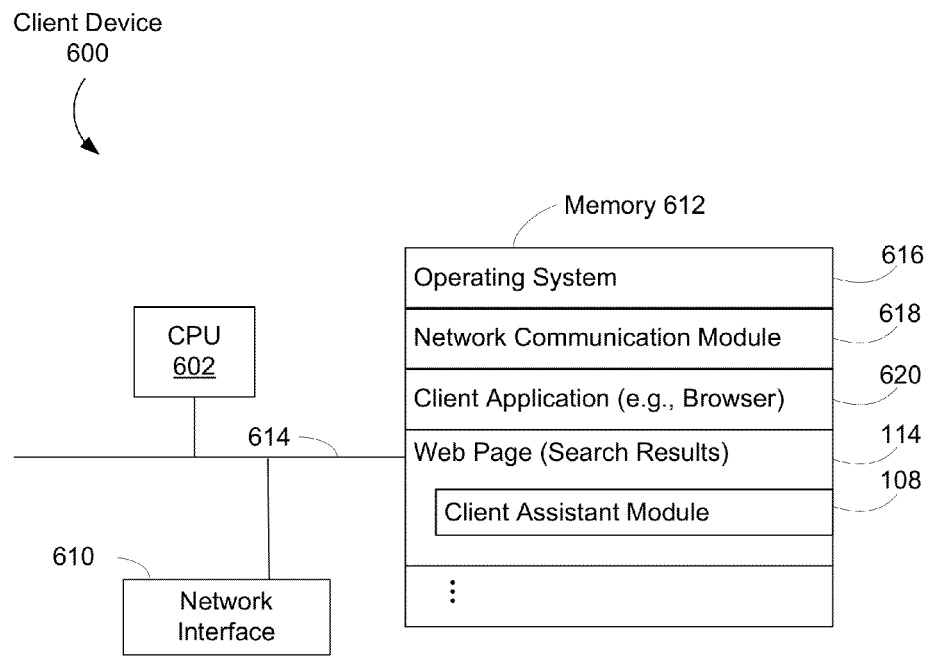
FIG. 6 is a block diagram of an exemplary client device in accordance with some embodiments.

FIG. 6 is a block diagram of a client device 600 in accordance with some embodiments. The device 600 generally includes one or more processing units (CPU's) 602, one or more network or other communications interfaces 610, memory 612, and one or more communication buses 614 for interconnecting these components. The communication buses 614 may include circuitry (sometimes called a chipset) that interconnects and controls communications between system components. The client device 600 optionally may include a user interface 605, for instance a display and a keyboard. Memory 612 may include high speed random access memory, such as DRAM, SRAM, DDR RAM or other random access solid state memory devices; and may also include non-volatile memory, such as one or more magnetic disk storage devices, optical disk storage devices, flash memory devices, or other non-volatile solid state storage devices. Memory 612 may include mass storage that is remotely located from the central processing unit(s) 602. Memory 612, or alternately the non-volatile memory device(s) within memory 612, comprises a computer readable storage medium. Memory 612 or the computer readable storage medium of memory 612 stores the following elements, or a subset of these elements, and may also include additional elements:

- an operating system 616 that includes procedures for handling various basic system services and for performing hardware dependent tasks;
- a network communication module 618 that is used for connecting the client 104 to other servers or computers via one or more communication networks (wired or wireless), such as the Internet, other wide area networks, local area networks, and metropolitan area networks and so on;
- a client application 620, such as a browser; and
- a client assistant 108 (e.g., toolbar, browser plug-in), for monitoring the activities of a user; in some embodiments, the client assistant, or a portion thereof, may be embedded in a respective search result web page returned to the client in response to a query.

FIG. 7 is a block diagram illustrating an information server system 700 in accordance with some embodiments. System 700 generally includes one or more processing units (CPU's) 702, one or more network or other communications interfaces 710, memory 712, and one or more communication buses 714 for interconnecting these components. System 700 optionally may include a user interface comprising a display device and a keyboard. Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU(s) 702. Memory 712, or alternately the non-volatile memory device(s) within memory 712, comprises a computer readable storage medium. Memory 712 or the computer readable storage medium of memory 712 stores the following elements, or a subset of these elements, and may also include additional elements:

- an operating system 716 that includes procedures for handling various basic system services and for performing hardware dependent tasks;
- a network communication module 718 that is used for connecting the information server system 130 to other computers via the one or more communication network interfaces 710 (wired or wireless) and one or more communication networks, such as the Internet, other wide area networks, local area networks, metropolitan area networks, and so on;
- a search engine 126 for processing queries;
- a user profile manager 128 for processing data relating to user profiles, and optionally for building and/or updating user profiles;
- an information classifier 136 for building and maintaining classification data;
- a query processor 124 for ordering search results according to the classification data of the search results and user profile information;
- a user profile database 132 for storing user profile information;
- a query log database 140 for storing user historical query information;
- an information classification database 134 for storing classification data; in some embodiments, the database 134 also includes seed classification data, while in other embodiments a separate seed classification database 138 is stored in memory of the server system 700;
- a query profile database 142 for storing classification data (or profiles) of user-submitted queries; and
- an intermediate result table 720.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. For example, some of the modules and/or databases shown in FIG. 7 may be encompassed within the search engine 126. In some embodiments, memory 612 and 712 may store a subset of the modules and data structures identified above. Furthermore, memory 612 and 712 may store additional modules and data structures not described above.

FIGS. 6 and 7 are intended more as functional descriptions of the various features of a client system and server system rather than a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. For example, the information classifier 136 may be implemented on a different set of servers than the other components of server system 700. The actual number of servers used to implement server system 700, and how features are allocated among them will vary from one implementation to another, and may depend in part on the amount of data traffic that the system must handle during peak usage periods as well as during average usage periods.

The classification data of information items can be used to address problems with question-answer online services, as well as other online services. For convenience, a user of a question-answer online service who solicits answers to a question from others through the service is referred herein to as an "inquirer" and a user of the service who volunteers or is invited to answer a question posted by others is referred to as a "consultant."

Figure 8A:
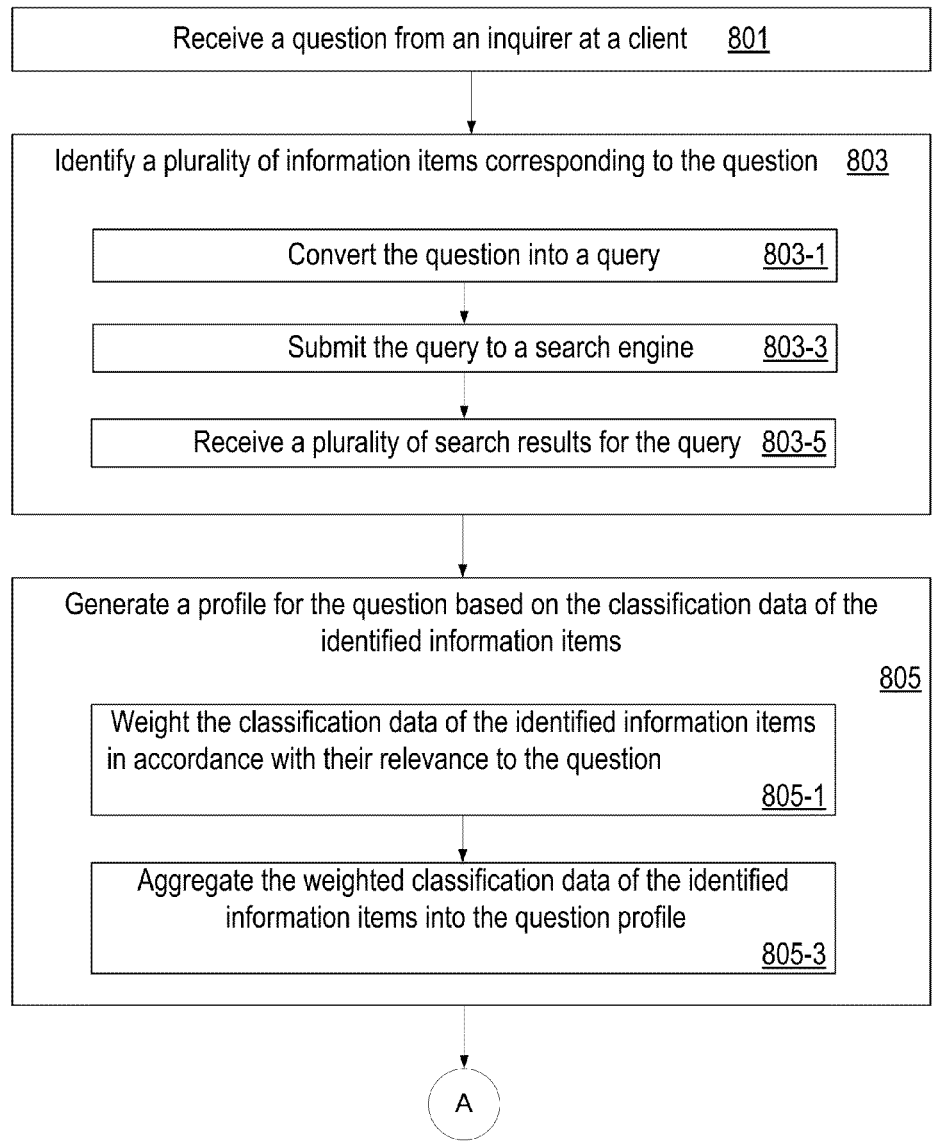
FIGS. 8A and 8B are flow diagrams illustrating an exemplary process for pushing a question to one or more consultants who may be able to answer the question in accordance with some embodiments.
Figure 8B:
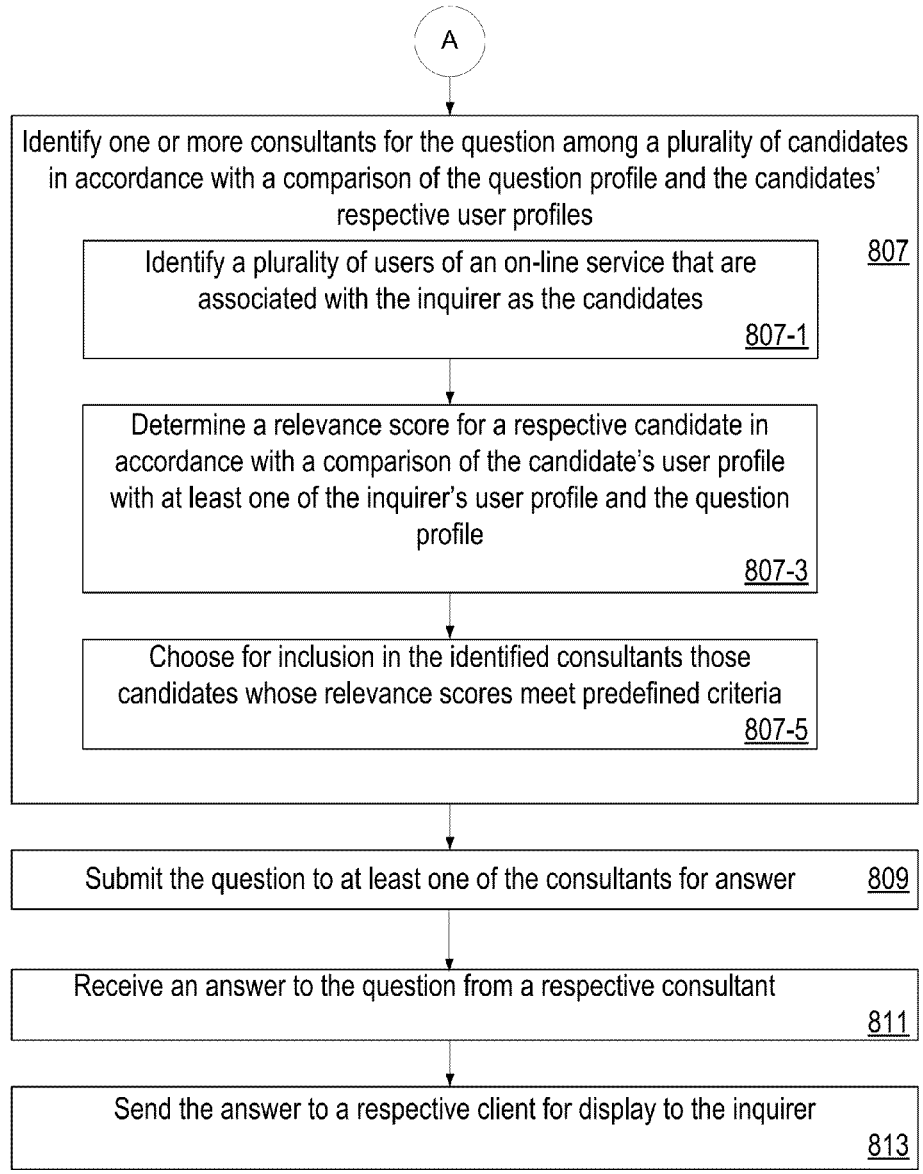

FIGS. 8A and 8B are flow diagrams illustrating an exemplary process at a server system for pushing a question to one or more consultants who may be able to answer the question in accordance with some embodiments.

The server system receives a question from an inquirer at a client (801). In some embodiments, the question-answer service is a standalone service provided by the server system. In some embodiments, the question-answer service is affiliated with or part of another online service provided by the server system. For example, the other online service may be email service, search engine service, blogging service, or social networking service.

As noted above, one issue with a conventional question-answer service is that the system has relatively little knowledge regarding who may be best qualified as a consultant for a particular question and, consequently, the question is broadcast to a large number of potential consultants. One aspect of this problem is that the exact nature of the information being sought by the question may be difficult for the service to determine. In some implementations, this aspect of the problem is addressed by generating a profile for the question (802). More specifically, in some implementations the server system first identifies a plurality of information items corresponding to the question posed by the inquirer (803). If one or more of the information items have classification data determined, the server system infers a question profile from the classification data.

In some embodiments, the server system converts the question into a query (803-1) and then submits the query to a search engine (803-3). When the question appears in the format of a few (e.g., three to five) keywords, no conversion is needed and the question can be submitted to the search engine directly as a query. However, when the question is comprised of a relatively long description, with keywords embedded in the description, a conversion process may be used to turn the long description into a small set of keywords. Exemplary approaches for accomplishing the conversion include: matching a question to one or more queries that occur in the query logs or performing semantic analysis of the description using well-known methods to identify those keywords and/or phrases. In some implementations, the identified keywords are divided into multiple queries and processed by the search engine separately. A weighted average of the corresponding search results is determined as the question's profile. In some implementations, the inquirer is provided with a user interface such that he or she can write a long description for the question in free format and also specify a few keywords for the question. In various implementations, the inquirer specifies the keywords by highlighting them in the long description or by entering them into a separate field within the user interface. The inquirer-specified keywords are then used to define the topic(s) of the question.

The search engine service may be hosted by another computer system or by the same server system that provides the question-answer service. For example, the search engine service may be an Internet search engine, such as the Google search engine. From the search engine, the server system receives a plurality of search results (803-5). The identified information items for the question are information items that correspond to search results. The information item corresponding to a respective search result is typically a web page, a website including multiple web pages, a document (e.g., a document including an image stored at a remote location), a video/audio stream, a database, a computational object, a search engine, or other online information service. The one or more identified information items (corresponding to the search results for the query) have classification data. (For example, the identified information items may be a subset of the information items corresponding to the search results, comprising the N (e.g., 20, 30, 40, 50, or 60) highest rated search results whose information items have classification data.) This classification data may be seed classification data, or classification data generated in accordance with the embodiments described above, or a mixture of both.

The server system generates a profile for the question based on the classification data of the identified information items (805). In some embodiments, this process is similar to the process of generating a query profile described above in conjunction with FIG. 3A. Assuming that a sufficient number of the search results correspond to information items that have classification data, the sever system generates a profile for the question by combining the classification data of at least a subset of the identified information items. In some embodiments, the combination of the classification data includes weighting the classification data of a respective information item in accordance with its relevance to the corresponding query or question (805-1) and aggregating the weighted classification data to generate at least a portion of the question profile (805-3). A more detailed description of the generation of the question profile is provided above. In some embodiments, the generation of a question profile uses the classification information of the inquirer. In one exemplary embodiment, the combined classification data for the identified information items is filtered with the inquirer's user profile so as to "shape" the question profile to reflect the inquirer's established interests.

For a particular inquirer, an answer from someone the inquirer is already familiar with or shares some similarities with is often more trustworthy than an answer from an unknown source. In some embodiments, the pool of candidates is chosen to be the inquirer's contacts or a subset thereof. For example, only those contacts that have communication with the inquirer beyond a predefined level, e.g., a predefined number of email exchanges (or other online communications) per week or in total, are included in the pool of candidates. As described below, analysis of online communications between an inquirer and others, and possibly other information indicative of personal or professional relationship as well, can be used to generate affinity metrics, each affinity metric representing a level of affinity between the inquirer and another person. In some other embodiments, the pool of candidates comes from users of an online service (of which the inquirer is also a user) that have similar background as the inquirer, e.g., attending the same college, working at the same company or the same unit within a company, or having similar academic, demographic or cultural background. In some embodiments, the server system allows an inquirer to manually identify and add individuals to the pool of candidates.

People with different quantities or frequencies of contact with the inquirer are deemed to have different levels of affinity with the inquirer. In some embodiments, the pool of candidates has a broad base, and a plurality of factors are used to determine which candidates receive the inquirer's question. For example, in some embodiments the plurality of factors, as applied to a respective candidate, includes both the candidate's level of expertise or familiarity with the subject matter of the inquirer's question and the level of affinity between the inquirer and the candidate. If two candidates have approximately the same or similar level of expertise with respect to a particular question, the one that has a higher level of affinity with the inquirer is chosen over the other one.

For each of the candidates, a user profile is obtained or determined, e.g., in accordance with the candidate's search history and query logs as described above in conjunction with FIG. 3C. Among the candidates, the server system identifies one or more consultants for the question in accordance with at least a comparison of the question profile and the user profiles of respective candidates (807). In some embodiments, this process includes identifying as the candidates a plurality of users of an online service that are associated with the inquirer (807-1). For example, if the inquirer is a customer of an online email service, the candidates may be selected to include any contacts in the inquirer's contacts list who meet predefined criteria. One of the predefined criteria may be a volume of electronic communications within a predefined period of time, such as a requirement of at least N email messages between the contact and the inquirer within a predefined period of time (e.g., at least one email message between the inquirer and the respective contact sometime in the past). Another example of a predefined criterion is: anyone included in list (sometimes called a buddy list) of people who are authorized or registered to exchange instant messages with the inquirer.

For each of the candidates, the server system determines a relevance score for the candidate in accordance with a comparison of the candidate's user profile with at least one of the inquirer's user profile and the question profile (807-3).

When the question profile correlates well with the candidate's user profile, the candidate may be more likely than not to possess some level of expertise related to the question. Stated another way, the correlation between the question profile and the candidate's user profile is a measure of how likely the candidate is to possess information relevant to the question. For example, if a candidate recently conducted extensive search on the subject of solar panel installation by, e.g., submitting queries including the keyword "solar panel," browsing websites of solar panel vendors in the search results, and downloading instructions on solar panel installation from respective websites, such user activities may be captured by an update to the candidate's user profile. If the question received from an inquirer concerns solar panels for home use, the question profile for this question is likely to have a high correlation with the candidate's updated user profile. The high correlation between the candidate's updated user profile and the question profile indicates that this candidate is probably a good candidate for providing a useful answer to the inquirer's question.

If a candidate's user profile is more closely related to the inquirer's user profile than other candidates, the inquirer may treat answers from this candidate as being more trustworthy than answers from others. For example, if the user profiles of both the candidate and the inquirer indicate similar interests in (for example) sports, entertainment, news, or the like, the inquirer is likely to find that the candidate's answers to at least some questions are more reliable than answers from candidates whose user profiles are less similar to the inquirer's user profile.

In some embodiments, a candidate's level of affinity (which can also be called an affinity metric) with the inquirer is also a factor for determining its relevance score. For example, a person usually gives more trust to the people he or she knows, as indicated by the people with whom he or she communicates, assuming that the same person does not communicate (or does not communication as much) with those people that he or she knows but does not trust. A candidate whom the inquirer knows and trusts should be given a higher level of affinity and the answer from this candidate should therefore be given more weight accordingly. There are different ways of determining whether the inquirer knows a particular candidate or not. For example, the inquirer may be allowed to manually select his or her candidates. In addition, it is also possible to make an educated guess about the relationship between two individuals based on information such as one or more of: whether or not (and how frequently) they exchange email or chat or other communications with each other, whether there are calendar events (e.g., meetings or other events in a calendar database) in which both individuals are participants, whether both individuals are collaborators in collaborative documents (e.g., a document co-written or otherwise shared by multiple participants, including these two individuals), whether or not they go (or went) to the same school or department during the same period of time, and whether or not they work (or worked) in the same company or division during the same period of time. In some embodiments, a candidate's affinity with an inquirer and the correlation of their user profiles are both considered for determining the relevance score. In some embodiments, the affinity is weighted more highly than the correlation of user profiles to honor the inquirer's own judgment. Other factors for determining the relevance score includes the candidate's historical propensity and ability to answer questions, how many questions the candidate has been asked recently, how quickly and fully he or she has responded in the past, whether the candidate and the inquirer speak the same language, their geographical locations, etc.

In some embodiments, other aspects of a candidate's user profile such as timing and consistency are considered when determining the relevance score between a question and a candidate. For example, the fact that a term in the question appears in the candidate's search history recently suggests that the candidate may have a fresh interest in the subject, which increases the likelihood that this candidate has the necessary expertise to answer the question. As a result, the relevance score between the question and candidate is higher than if the candidate's last online activity related to the question occurred long ago. The fact that a question term appears repeatedly in the candidate's search history for an extended period of time is another indicator that the candidate may have an ongoing interest in the subject of the question, which warrants a high relevance score between the question and the candidate.

If the relevance score between a question and a particular candidate meets predefined criteria, e.g., exceeding a predefined threshold level, the server system includes the candidate as one of the identified consultants to whom the inquirer's question may be sent (807-5). In another example, the predefined criteria may be to produce an ordered list of the candidates, and to select the top N (e.g., a number between two and ten) candidates as identified consultants. Additional criteria may be used (e.g., a threshold or other quality control criteria) to prevent the identification of unsuitable candidates as consultants.

Next, the server system submits the question to one or more of the identified consultants for answer (809). In some embodiments, the server system submits the question to the identified consultants all at once. In some embodiments, the server system starts with the top tier of consultants (e.g., those consultants that have the highest relevance scores or a fixed number of consultants) and moves to the next tier of consultants if, e.g., the number of answers from the top tier of consultants within a time period (e.g., 24 hours) is less than a threshold level or no answer from any of the top-tier consultant satisfies the inquirer. If the server system determines that a question has received at least a predefined number of qualified answers from the identified consultants, the server system may mark the question as "being answered" and may store the question and its associated answers in a database, or elsewhere in the system. The location where the answers are stored may be predefined, obtained by a lookup operation, or recorded in a data structure for subsequent retrieval. When an inquirer subsequently submits the same or similar question, the server system can refer the inquirer to the location where the answers are stored. As will be explained below, the question may be delivered to the consultants via email or a dedicated client-side software application.

After receiving an answer to the question from a respective consultant (811), the server system sends the answer to a respective client for display to the inquirer (813). In some embodiments, the server system also sends the answer to other consultants that have received the same question if the answer is marked as "public." In doing so, the other consultants are aware of what answers the inquirer has received and they can then decide whether it is necessary (in their opinion) to supplement any of the answers posted by another consultant.

The process described above mainly focuses on the operations at a server system in response to a question submitted by an inquirer. On the client side, the question-answer service may exist as a standalone client application or as a plug-in attached to another client-side application (such as a web browser). FIGS. 9A and 9B are block diagrams illustrating exemplary screenshots of displaying questions and answers to an inquirer in accordance with some embodiments.

FIG. 9A depicts a window 900 that includes a list of questions submitted by an inquirer. There is a textbox 902 and a "Submit" button near the top of the window. When the inquirer has a question to consult others, he or she can enter a question into the textbox 902 and then click the "Submit" button. The question is received and processed by the server system. In some embodiments, the question is processed in accordance with the methodology described above in conjunction FIGS. 8A and 8B.

In the example shown in FIG. 9A, the window shows two question entries submitted by the inquirer in the past, "solar panel for home use" 904 and "LCD vs. Plasma" 906. Note that a question may be expressed in different ways, e.g., using one or more sentences or just a few keywords, as long as it can be understood by potential consultants. A respective question entry (904) may include some or all of the following items: a question itself (904-1), the number of comments (or answers) to the question (904-3), the timestamp of the most recent comment (904-5), and a graphical user interface (GUI) object for visualizing the comments (904-7). In some embodiments, the questions in the window 900 are ordered by the timestamp of the most recent comment for each question to give the inquirer a chance to view the most recent comments. In some embodiments, the questions are ordered such that questions that have at least one comment unopened appear before questions for which all comments have already been opened by the inquirer.

In some embodiments, the inquirer can also perform a search of all the questions submitted by the inquirer by entering a query term in the textbox 902 and clicking a "Search" button (not shown in the figure). In some embodiments, the search may be conducted through another application (e.g., email or blog) that is affiliated with the question-answer service.

FIG. 9B is a screenshot further depicting two comments responsive to the question "LCD vs. Plasma" after the inquirer's selection of the corresponding GUI object. In this example, Jackie and Henry are two individuals who were chosen by the server system as consultants to address the question and who provided answers (in this case, their opinions) about the two popular models of flat panel TVs. Note that each answer includes some or all of the following items: the identity of the consultant (906-1), the timestamp of the answer (906-3), the privacy type of answer (public or private) (906-5), a reply GUI object (906-7), and the body of the answer (906-8). The privacy type of an answer determines whether the answer is limited to the inquirer or can be viewed by other consultants. In this example, the answer from Jackie is set to be "public" and can be viewed by other consultants including Henry. But Henry sets his answer to be "private" because he may not want Jackie to know that he disagrees with her position. If the inquirer has a follow-up question after reading a particular answer, he or she can do so by selecting the reply GUI object. As a result, a sub-window appears in the window 900 allowing the inquirer to enter the follow-up question.

In some embodiments, the answers to the same question are ordered by their timestamps, i.e., when they are received by the server system or by the client associated with the inquirer. In some embodiments, the answers are ordered by relevance scores based on the inquirer's user profile, the question profile, and the consultants' user profile. By doing so, the inquirer is given the opportunity to review answers having the highest relevance scores before deciding whether to review other answers having lower relevance scores. In some embodiments, the answers are ordered, at least in part, by affinity scores based on one or more measurements (e.g., a measurement of the amount of communication, if any, between the inquirer and each consultant who has submitted an answer) of the strength of the connection between the inquirer and each consultant who has submitted an answer.

In some embodiments, the answers from those consultants who have higher levels of affinity with the inquirer (e.g., those the inquirer knows and trusts) are moved up in the list to a more prominent position and/or otherwise highlighted to attract more attention from the inquirer. As noted above, there are different ways of determining the level of affinity between two individuals based on, e.g., how frequently they exchange information with each other as well as other measures known in the art.

In some embodiments (e.g., embodiments using a "push model"), when a consultant is chosen to answer a question, he or she receives a notice or alert in the form of a pop-up window if he or she is currently online, or alternatively, receives an email message or other appropriate notification. In some embodiments, the server system manages the number of questions assigned to different consultants to ensure that no consultant is overwhelmed by too many questions. For example, the server system monitors the responsiveness of each consultant and the number of unanswered questions from the same consultant over the time. Using this information, the server system identifies consultants who are both qualified to answer a respective question and likely (based on the monitored responsiveness of the consultants) to respond quickly (e.g., within a predefined period of time), and forwards the respective question to the one or multiple qualified consultants who are most likely to answer the question within a reasonable amount of time (e.g., the aforementioned predefined period of time). This methodology keeps the overall or average latency experienced by the inquirers at a low level.

In some other embodiments (e.g., embodiments using a "pull model"), rather than being chosen to provide an answer to a particular question, a consultant may select questions for which he or she may have the necessary knowledge and is also interested in answering. As will be explained below, the server system in this case is responsible for identifying questions that the consultant is most likely to answer and submitting them to the consultant at a respective client.

Alternately, when a consultant visits a website, web page or online service associated with the same topic as some of the pending questions, one or more of the pending questions on that topic are presented to the consultant. From another viewpoint, when multiple candidate consultants are visiting an online resource (website, web page or online service) associated with the same topic as a pending question, the server system selects a best set of one or more of the consultants (from among the set of candidate consultants currently visiting the online resource) to whom the pending question is presented. For example, when determining which questions to submit to particular consultants, or when determining the consultants to which a particular question is to be sent or presented, the server system may take into account which consultants have visited one or more specified resources (e.g., web pages) associated with a particular topic, and how frequently they visited those resources during one or more predefined time periods, so as to determine how strongly the inquirer is associated with the particular topic. The selection of consultants to whom the question is presented is based on any one or combination of the consultant selection factors discussed elsewhere in this document.

In addition to the consultant selection factors and methods discussed in this document, the assignment of questions to consultants may be viewed as a load balancing or loading optimization problem. In this view, the goal is to obtain satisfactory and sufficiently detailed answers to the questions posed by the inquirers while minimizing the burden on the people (the consultants) that provide the answers. Another goal is to minimize or limit redundant work. To meet these additional goals, the number of consultants to whom any one question is presented is limited. For example, question distribution may take into account the number of consultants who have already seen or picked up the question. In some embodiments, random distribution (e.g., to N of M qualified consultants) is used to help spread the average load over the available consultants.

Figure 10A:
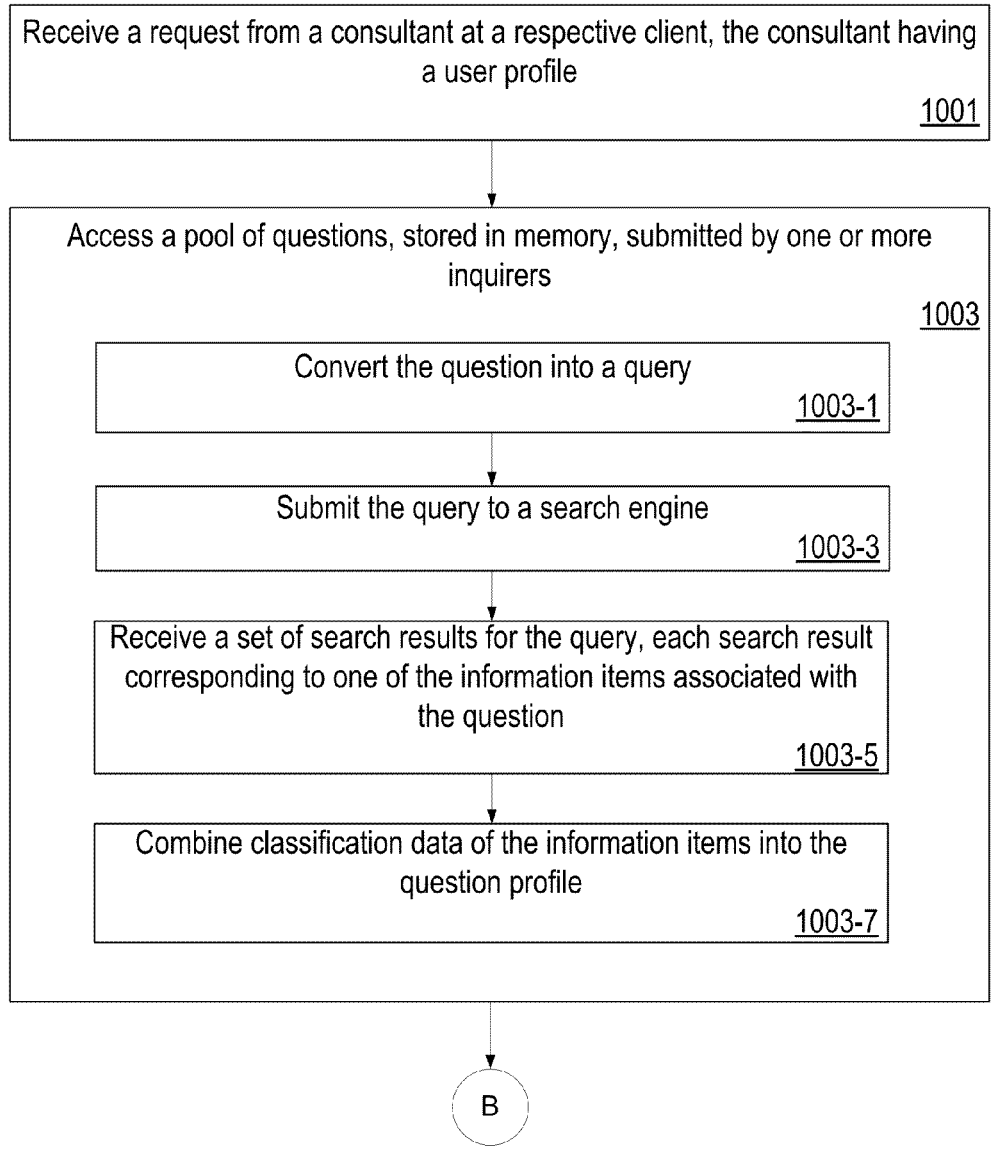
FIGS. 10A and 10B are flow diagrams illustrating an exemplary process at a server system for pulling one or more questions from a question pool for a consultant who may be able to answer the questions in accordance with some embodiments.
Figure 10B:
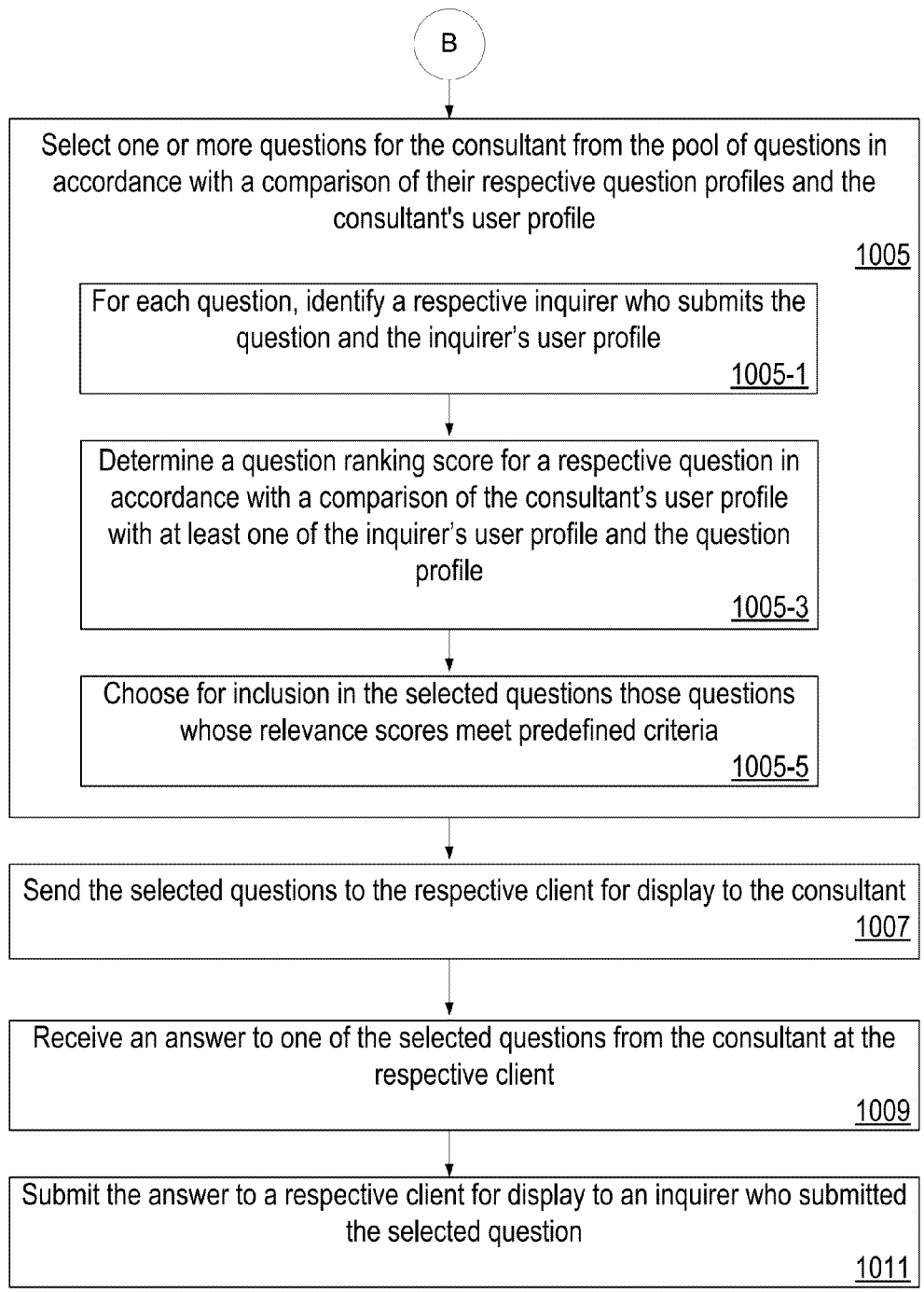

FIGS. 10A and 10B are flow diagrams illustrating an exemplary process at a server system for identifying one or more questions from a question pool for sending to a consultant who may be able to answer the questions, in accordance with some embodiments.

The server system receives a request from a consultant at a client (1001). In some embodiments, the consultant has a user profile determined in accordance with some embodiments. In some embodiments, the question-answer service is a standalone service hosted by the server system. In some embodiments, the question-answer service is affiliated with or part of another online service such as email service, blogging service, search engine service, or social networking service.

In response to the request, the server system first identifies a pool of questions stored in memory, e.g., in a database (1003). In some embodiments, these questions are submitted by different inquirers at different times. But as noted above, an inquirer may not be interested in an answer from an unfamiliar source. Similarly, a consultant may not be motivated to provide an answer to a question from an unknown inquirer. Therefore, in at least some embodiments, the server system may limit the identified questions to those submitted by inquirers who are associated with the consultant in accordance with predefined criteria.

In some embodiments, the inquirers who satisfy the predefined criteria are included in the consultant's contacts or a subset thereof. For example, the server system only considers questions from those contacts that have been in communication with the consultant beyond a predefined level, e.g., a predefined number of email exchanges per week or in total. As noted above, the amount of contact between the consultant and an inquirer can be quantified as an affinity metric or level. The affinity level between the consultant and the consultant's contacts can be used to determine (or can be used as a factor, along with other factors to determine) which inquirers' questions are to be provided to (e.g., sent to or presented to) the consultant. In some embodiments, the inquirers may be users of an online service (of which the consultant is also a user) that have similar background as the consultant, e.g., attending the same college, working at the same company or in the same division of a company, or having similar academic, demographic or cultural background. In some embodiments, the server system allows a consultant to manually identify inquirers and questions submitted by these inquirers.

As explained above, a question can be profiled in accordance with some embodiments. To do so, the server system converts the question into a query (1003-1) and then submits the query to a search engine (1003-3). From the search engine, the server system receives a plurality of search results (1003-5). A respective search result identifies an information item for which there is predetermined classification data. This classification data may be seed classification data or classification data generated in accordance with some embodiments of the present application or a mixture of both. The server system generates a profile for the question by combining the classification data of the information items identified in the search results (1003-7). In some embodiments, the combination of the classification data includes weighting the classification data of a respective information item in accordance with its relevance to the corresponding query and aggregating the weighted classification data to generate the question profile. A more detailed description of the generation of the question profile is provided above in conjunction with FIG. 3A.

Based at least in part on the question profiles, the server system selects one or more questions to be submitted to the consultant by comparing their respective profile with the consultant's user profile (1005). In some embodiments, for each question in the question pool, the server system identifies its inquirer and the inquirer's user profile (1005-1) and determines a relevance score for the question in accordance with a comparison of the consultant's user profile with at least one of the question profile and the inquirer's user profile (1005-3). If the consultant's user profile correlates well with the question profile, this suggests that the consultant may possess some level of expertise related to the question. Similarly, if the consultant's user profile is closely related to the inquirer's user profile, the inquirer may treat an answer (to a question)

received from this consultant as being more trustworthy than answers received from other consultants. In some embodiments, an inquirer's level of affinity with the consultant is also considered and given a significant weight when determining a question's relevance score. Methods of measuring the level of affinity between two individuals are discussed elsewhere in this document.

In some embodiments, other aspects of a consultant's user profile such as timing and consistency are also considered when determining the relevance score between a question and the consultant. For example, the fact that a term in the question appears in the consultant's search history (or other online history) recently suggests that the consultant may have a fresh interest in and updated knowledge on the subject. Thus, this consultant may be better qualified to provide a satisfactory answer to the question. The relevance score between a question term or question topic and the consultant is increased when the consultant's search history or other online history meets predefined criteria for recent activity with respect to the topic or topics associated with the question. Optionally, the relevance score between a question term or question topic and the consultant is increased when the question term or topic appears repeatedly in the consultant's search history or other online history for an extended period of time, as this pattern indicates that the consultant has an ongoing interest in and sufficient knowledge about the question term or topic. Furthermore, in some implementations, synonyms of terms in a consultant's user profile and terms related to the terms in a consultant's user profile are also used to establish the relevance score between a question and the consultant.

If the relevance score of a particular question meets predefined criteria, e.g., exceeding a predefined threshold level, the server system includes the question as one of the questions to be sent to the consultant for answer (1005-5). Next, the server system submits one or more of the selected questions to the consultant (1007). After receiving an answer to one of the selected questions from the consultant at a respective client (1009), the server system sends the answer to a respective client for display to the inquirer (1011).

Similar to the disclosure above in connection with FIGS. 8A and 8B, the server system manages the total number and frequency of questions displayed to different consultants to avoid the scenario that some of the questions are given more exposure than others such that some questions have many redundant answers while other question have very few answers. For example, the server system randomly and evenly distributes questions among a group of consultants and monitors the answering progress of each question. Once a question has received a predefined number of answers, the server stops submitting the question to consultants until the other questions have received a similar amount of exposure. By doing so, the server system can effectively optimize its resource usage and reduce the overall latency experienced by the inquirers.

Figure 11A:
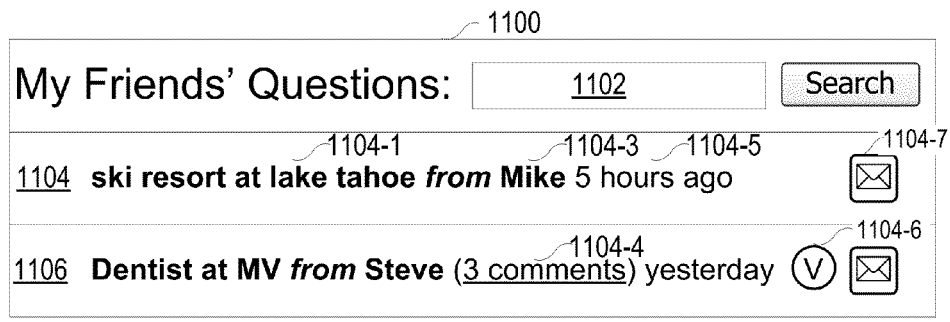
FIGS. 11A and 11B are block diagrams illustrating exemplary screenshots of displaying questions and answers to a consultant in accordance with some embodiments.
Figure 11B:
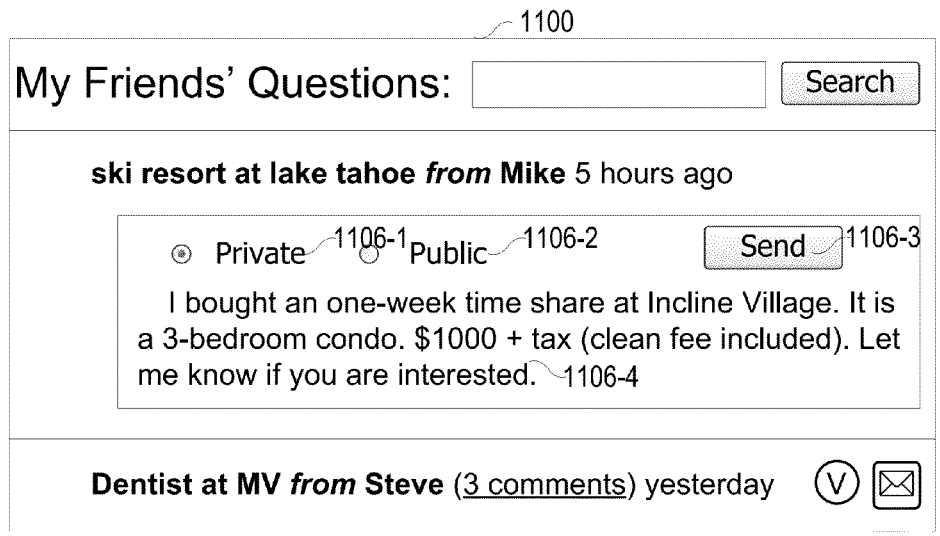

The process described above mainly focuses on the operations at a server system in response to a request from a consultant. On the client side, the question-answer service may exist as a standalone client application or as a plug-in attached to another client-side application (such as a web browser). FIGS. 11A and 11B are block diagrams illustrating exemplary screenshots of displaying questions and answers to a consultant in accordance with some embodiments.

FIG. 11A depicts a window 1100 that includes a list of questions the server system selected for a respective consultant. There is a textbox 1102 and a "Search" button near the top of the window. The consultant can refine the server system's selection by entering one or more query terms into the textbox 902 and then click the "Search" button.

In this example, the window shows two question entries submitted by two inquirers in the past, "ski resort at lake tahoe" 1104 from Mike and "Dentist at MV" 1106 from Steve. A respective question entry (1104, 1106) may include some or all of the following items: a question itself (1104-1), the identity of the inquirer (1104-3), the current number of comments (or answers) to the question (1104-4), the timestamp of the most recent comment (1104-5), a GUI object for visualizing the comments (1104-6), and a reply GUI object (1104-7). In some embodiments, the questions in the window 1100 are ordered by the timestamp of the most recent comment for each question. In some embodiments, the questions are ordered in accordance with the relevance scores between the consultant and the questions (see description of item 1005, FIG. 10B) such that questions that are most relevant to the consultant are listed more prominently (e.g., higher in the list) than questions with lower relevance scores.

FIG. 11B is a screenshot further depicting the answer region responsive to the question "ski resort at lake tahoe" after the consultant's selection of the reply GUI object 1104-7. In this example, the answer includes some or all of the following items: the privacy type of the answer (public or private) (1106-1, 1106-2), a "Send" button (1106-3), and the body of the answer (1106-4). The privacy type of an answer determines whether the answer is to be exposed to the inquirer alone or can be viewed by other consultants who have answered the same question in the past or who answer the same question in the future.

In some embodiments, when the server system receives an answer to an inquirer's question, the server system sends a notice or alert to the inquirer in the form of a pop-up window if the inquirer is currently online, or alternatively, an email message or other appropriate notification.

While the two question-answer service models described above approach the same problem from different angles, they are not mutually exclusive. In some embodiments, they can be implemented together by the same server system to compliment each other. For example, upon receiving a question from an inquirer, besides identifying one or more consultants and forwarding the question to them for answer, as disclosed above in conjunction with FIGS. 8A and 8B, the server system can also put the question and information about its profile and the inquirer's user profile in a question pool. Upon receiving a request from a consultant for questions, the server system may find that the question is a good match for the consultant and send the question to the consultant. If the consultant was previously chosen but failed to answer the question, this may give him or her a new opportunity to do so.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, the server system may conduct a survey among inquirers to rank the answers to their questions from different consultants. If the answers from a particular consultant meet a predefined satisfaction level according to the inquirers' responses to the survey, the server system may assign a high credibility score to the consultant such that this consultant is more favored over others who have relatively low credibility scores when the server system selects consultants for another question in the future. In some embodiments, the server system identifies a list of frequently asked questions and one or more credible answers to each question and stores them in a database. If a question submitted by an inquirer is deemed to be similar to one of the frequently asked questions, the server system, in addition to choosing consultants to address the question, may return at least one of the credible answers to the inquirer if it determines that the inquirer may find the answer useful.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
on a server system having one or more processors and memory storing programs executed by the one or more processors,
receiving a question from an inquirer at a client;
identifying a plurality of information items corresponding to the question, one or more of the information items each having classification data;
generating a question profile for the question based on the classification data of the information items;
identifying one or more consultants for the question among a plurality of candidates in accordance with a comparison of the question profile and respective user profiles of the candidates; and
submitting the question to at least one of the identified consultants for answer;
wherein
generating the question profile for the question includes identifying information items corresponding to at least a subset of search results corresponding to the question, and combining classification data of the identified information items to generate at least a portion of the question profile; and
combining the classification data of the identified information items includes:
weighting the classification data of the identified information items in accordance with their relevance to the question; and
aggregating the weighted classification data of the identified information items into the question profile.

2. The computer-implemented method of claim 1, further comprising:
receiving an answer to the question from the consultant; and
sending the answer to a respective client for display to the inquirer.

3. The computer-implemented method of claim 1, wherein identifying the plurality of information items further includes:
converting the question into a query;
submitting the query to a search engine; and
receiving from the search engine a plurality of search results for the query.

4. The computer-implemented method of claim 1, wherein identifying one or more consultants further includes:
identifying as the candidates a plurality of users of an on-line service who are associated with the inquirer;
determining a relevance score for a respective candidate in accordance with a comparison of the candidate's user profile with at least one of the inquirer's user profile and the question profile; and
choosing for inclusion in the identified consultants those candidates whose relevance scores meet predefined criteria.

5. The computer-implemented method of claim 4, wherein the plurality of users associated with the inquirer are identified from the inquirer's contacts at the on-line service.

6. The computer-implemented method of claim 4, wherein the plurality of users associated with the inquirer are manually identified by the inquirer.

7. A computer-implemented method, comprising:
on a server system having one or more processors and memory storing programs executed by the one or more processors,
receiving a request from a consultant at a respective client, the consultant having a user profile; and
responding to the received request by:
accessing a pool of questions, stored in memory, submitted by one or more inquirers, each question having a question profile determined in accordance with information items associated with the question;
selecting one or more questions for the consultant from the pool of questions in accordance with a comparison of their respective question profiles and the consultant's user profile; and
sending the selected questions to the respective client for display to the consultant;
wherein the question profile is determined by:
converting the question into a query;
submitting the query to a search engine;
receiving from the search engine a set of search results for the query, and identifying information items corresponding to at least a subset of the search results; and
combining classification data of the identified information items to generate at least a portion of the question profile; and
wherein combining the classification data of the identified information items includes:
weighting the classification data of the identified information items in accordance with their relevance to the question; and
aggregating the weighted classification data of the identified information items into the question profile.

8. The computer-implemented method of claim 7, further comprising:
receiving an answer to one of the selected questions from the consultant at the respective client; and
submitting the answer to a respective client for display to an inquirer who submitted the selected question.

9. The computer-implemented method of claim 7, wherein selecting one or more questions for the consultant further includes:
for a respective question, identifying a respective inquirer who submits the question and a user profile of the inquirer;
determining a relevance score for the respective question in accordance with a comparison of the candidate's user profile with at least one of the inquirer's user profile and the question profile; and
choosing for inclusion in the selected questions one or more questions whose relevance scores meet predefined criteria.

10. A server system, comprising:
one or more processors;
memory; and
one or more programs, wherein the one or more programs are stored in the memory and configured to be executed by the one or more processors, the one or more programs including:
instructions for receiving a question from an inquirer at a client;
instructions for identifying a plurality of information items corresponding to the question, one or more of the information items each having classification data;

instructions for generating a question profile for the question based on the classification data of the information items;

instructions for identifying one or more consultants for the question among a plurality of candidates in accordance with a comparison of the question profile and respective user profiles of the candidates; and instructions for submitting the question to at least one of the consultants for answer;

wherein the instructions for generating the question profile for the question include instructions for: identifying information items corresponding to at least a subset of search results corresponding to the question, and combining classification data of the identified information items to generate at least a portion of the question profile; and the instructions for combining the classification data of the identified information items further include instructions to:

weight the classification data of the identified information items in accordance with their relevance to the question; and aggregate the weighted classification data of the identified information items into the question profile.

11. The server system of claim 10, further comprising:
instructions for receiving an answer to the question from the consultant; and
instructions for sending the answer to a respective client for display to the inquirer.

12. The server system of claim 10, wherein the instructions for identifying the plurality of information items further include:
instructions for converting the question into a query;
instructions for submitting the query to a search engine; and
instructions for receiving from the search engine a plurality of search results for the query.

13. A server system, comprising:
one or more processors;
memory; and
one or more programs, wherein the one or more programs are stored in the memory and configured to be executed by the one or more processors, the one or more programs including:
instructions for receiving a request from a consultant at a respective client, the consultant having a user profile; and
instructions for responding to the received request by:
accessing a pool of questions, stored in memory, submitted by one or more inquirers, each question having a question profile determined in accordance with information items associated with the question;
selecting one or more questions for the consultant from the pool of questions in accordance with a comparison of their respective question profiles and the consultant's user profile; and
sending the selected questions to the respective client for display to the consultant;
wherein the question profile is determined by:
converting the question into a query;
submitting the query to a search engine;
receiving from the search engine a set of search results for the query, and identifying information items corresponding to at least a subset of the search results; and
combining classification data of the identified information items to generate at least a portion of the question profile; and wherein combining the classification data of the identified information items includes:
weighting the classification data of the identified information items in accordance with their relevance to the question; and
aggregating the weighted classification data of the identified information items into the question profile.

14. A non-transitory computer readable storage medium and one or more computer programs embedded therein, the one or more computer programs comprising instructions, which when executed by a computer system, cause the computer system to:
receive a question from an inquirer at a client;
identify a plurality of information items corresponding to the question, one or more of the information items each having classification data;
generate a question profile for the question based on the classification data of the information items;
identify one or more consultants for the question among a plurality of candidates in accordance with a comparison of the question profile and the respective user profiles of the candidates; and
submit the question to at least one of the consultants for answer;
wherein
the instructions for generating the profile for the question further include instructions, which when executed, cause the computer system to identify information items corresponding to at least a subset of search results corresponding to the question, and combine classification data of the identified information items to generate at least a portion of the question profile; and
the instructions for combining the classification data of the identified information items further include instructions, which when executed, cause the computer system to:
weight the classification data of the identified information items in accordance with their relevance to the question; and
aggregate the weighted classification data of the identified information items into the question profile.

15. The non-transitory computer readable storage medium of claim 14, wherein the one or more computer programs further include instructions, which when executed, cause the computer system to:
receive an answer to the question from the consultant; and
send the answer to a respective client for display to the inquirer.

16. The non-transitory computer readable storage medium of claim 14, wherein the instructions for identifying the plurality of information items further include instructions, which when executed, cause the computer system to:
convert the question into a query;
submit the query to a search engine; and
receive from the search engine a plurality of search results for the query.

17. The non-transitory computer readable storage medium of claim 14, wherein the instructions for identifying one or more consultants further include instructions, which when executed, cause the computer system to:
identify as the candidates a plurality of users of an on-line service that are associated with the inquirer;
determine a relevance score for a respective candidate in accordance with a comparison of the candidate's user profile with at least one of the inquirer's user profile and the question profile; and choose for inclusion in the identified consultants those candidates whose relevance scores meet predefined criteria.

18. A non-transitory computer readable storage medium and one or more computer programs embedded therein, the one or more computer programs comprising instructions, which when executed by a server system, cause the computer system to:
- receive a request from a consultant at a respective client, the consultant having a user profile; and
- respond to the received request by:
  - accessing a pool of questions, stored in memory, submitted by one or more inquirers, each question having a question profile determined in accordance with information items associated with the question;
  - selecting one or more questions for the consultant from the pool of questions in accordance with a comparison of their respective question profiles and the consultant's user profile; and
  - sending the selected questions to the respective client for display to the consultant;
- wherein the question profile is determined by:
  - converting the question into a query;
  - submitting the query to a search engine;
  - receiving from the search engine a set of search results for the query, and identifying information items corresponding to at least a subset of the search results; and
  - combining classification data of the identified information items to generate at least a portion of the question profile; and wherein combining the classification data of the identified information items includes:
- weighting the classification data of the identified information items in accordance with their relevance to the question; and
- aggregating the weighted classification data of the identified information items into the question profile.

19. The non-transitory computer readable storage medium of claim 18, wherein the one or more computer programs further include instructions, which when executed, cause the computer system to:
- receive an answer to one of the selected questions from the consultant at the respective client; and
- submit the answer to a respective client for display to an inquirer who submitted the selected question.

20. The non-transitory computer readable storage medium of claim 18, wherein the instructions for selecting one or more questions for the consultant further include instructions, which when executed, cause the computer system to:
- for a respective question, identify a respective inquirer who submits the question and a user profile of the inquirer;
- determine a relevance score for the respective question in accordance with a comparison of the candidate's user profile with at least one of the inquirer's user profile and the question profile; and
- choose for inclusion in the selected questions those questions whose relevance scores meet predefined criteria.

* * * * *